(12) United States Patent
Marsden

(10) Patent No.: US 11,263,182 B2
(45) Date of Patent: *Mar. 1, 2022

(54) SYSTEM FOR LIVE-MIGRATION AND AUTOMATED RECOVERY OF APPLICATIONS IN A DISTRIBUTED SYSTEM

(71) Applicant: OPEN INVENTION NETWORK, LLC, Durham, NC (US)

(72) Inventor: Luke Marsden, Bristol (GB)

(73) Assignee: OPEN INVENTION NETWORK, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,187

(22) Filed: Jun. 4, 2019

(65) Prior Publication Data

US 2019/0286619 A1   Sep. 19, 2019

Related U.S. Application Data

(63) Continuation of application No. 14/109,545, filed on Dec. 17, 2013, now Pat. No. 10,311,027, which is a (Continued)

(30) Foreign Application Priority Data

Sep. 23, 2011  (GB) ..................................... 1116408

(51) Int. Cl.
*G06F 17/00*  (2019.01)
*G06F 16/182*  (2019.01)
(Continued)

(52) U.S. Cl.
CPC .......... *G06F 16/184* (2019.01); *H04L 67/148* (2013.01); *H04L 67/42* (2013.01); *H04L 69/40* (2013.01)

(58) Field of Classification Search
CPC ...... G06F 16/184; G06F 3/0647; G06F 3/061; G06F 3/065; G06F 3/067;
(Continued)

(56) References Cited

U.S. PATENT DOCUMENTS 5,627,961 A   5/1997 Sharman
5,794,253 A   8/1998 Norin et al.
(Continued)

FOREIGN PATENT DOCUMENTS

CN   1779650 A    5/2006
CN   101460934 A  6/2009

*Primary Examiner* — Greta L Robinson

(57) ABSTRACT

A method and apparatus for distribution of applications amongst a number of servers, ensuring that changes to application data on a master for that application are asynchronously replicated to a number of slaves for that application. Servers may be located in geographically diverse locations; the invention permits data replication over high-latency and lossy network connections and failure-tolerance under hardware and network failure conditions. Access to applications is mediated by a distributed protocol handler which allows any request for any application to be addressed to any server, and which, when working in tandem with the replication system, pauses connections momentarily to allow seamless, consistent live-migration of applications and their state between servers. Additionally, a system which controls the aforementioned live-migration based on dynamic measurement of load generated by each application and the topological preferences of each application, in order to automatically keep servers at an optimum utilisation level.

20 Claims, 9 Drawing Sheets

Related U.S. Application Data continuation of application No. 14/124,221, filed as application No. PCT/EP2012/068798 on Sep. 24, 2012.

(51) Int. Cl.
*H04L 67/01* (2022.01)
*H04L 69/40* (2022.01)
*H04L 67/148* (2022.01)

(58) Field of Classification Search
CPC ......... G06F 2209/505; G06F 2209/508; G06F 9/5061; G06F 9/5027; H04L 69/40; H04L 67/148; H04L 67/42; H04L 67/1095; H04L 67/1002
See application file for complete search history.

(56) References Cited

U.S. PATENT DOCUMENTS

| | | | |
|---|---|---|---|
| 5,806,074 | A | 9/1998 | Souder et al. |
| 6,374,262 | B1 | 4/2002 | Kodama |
| 6,601,084 | B1 | 7/2003 | Bhaskaran et al. |
| 6,876,625 | B1 | 4/2005 | McAllister et al. |
| 6,993,539 | B2 | 1/2006 | Federwisch et al. |
| 7,111,013 | B2 | 9/2006 | Federighi et al. |
| 7,246,255 | B1 | 7/2007 | Heideman et al. |
| 7,461,130 | B1 | 12/2008 | Abdelaziz et al. |
| 7,562,078 | B1 | 7/2009 | Yadav et al. |
| 7,617,289 | B2 | 11/2009 | Srinivasan et al. |
| 7,668,923 | B2 | 2/2010 | Herring et al. |
| 7,672,979 | B1 | 3/2010 | Appellof et al. |
| 7,694,076 | B2 | 4/2010 | Lowery et al. |
| 7,757,236 | B1 | 7/2010 | Singh |
| 7,823,156 | B2 | 10/2010 | Soules et al. |
| 7,873,868 | B1 | 1/2011 | Heideman et al. |
| 8,009,555 | B2 | 8/2011 | Ralev |
| 8,041,798 | B1 | 10/2011 | Pabla et al. |
| 8,250,033 | B1 | 8/2012 | Souter et al. |
| 8,458,181 | B2 * | 6/2013 | Adkins ................. G06F 16/18 707/737 |
| 8,473,775 | B1 | 6/2013 | Helmick et al. |
| 8,495,019 | B2 | 7/2013 | Shisheng et al. |
| 8,577,842 | B1 | 11/2013 | Nagargadde et al. |
| 9,052,831 | B1 | 6/2015 | Stefani et al. |
| 9,477,739 | B2 | 10/2016 | Marsden |
| 9,483,542 | B2 | 11/2016 | Marsden |
| 10,311,027 | B2 * | 6/2019 | Marsden ............... G06F 16/184 |
| 10,331,801 | B2 | 6/2019 | Marsden |
| 2002/0062377 | A1 | 5/2002 | Hillman et al. |
| 2002/0120706 | A1 | 8/2002 | Murphy |
| 2003/0126133 | A1 | 7/2003 | Dattatri et al. |
| 2004/0117571 | A1 | 6/2004 | Chang et al. |
| 2004/0117666 | A1 | 6/2004 | Lavender et al. |
| 2004/0139125 | A1 | 7/2004 | Strassburg et al. |
| 2004/0230619 | A1 | 11/2004 | Blanco et al. |
| 2004/0236745 | A1 | 11/2004 | Keohane et al. |
| 2005/0027748 | A1 | 2/2005 | Kisley |
| 2005/0080920 | A1 | 4/2005 | Bender et al. |
| 2005/0114412 | A1 | 5/2005 | Gerhard |
| 2005/0149468 | A1 | 7/2005 | Abraham |
| 2005/0188256 | A1 | 8/2005 | Stager et al. |
| 2006/0053216 | A1 | 3/2006 | Deokar et al. |
| 2006/0168084 | A1 | 7/2006 | Kogan et al. |
| 2007/0150526 | A1 | 6/2007 | D'Souza et al. |
| 2007/0255763 | A1 | 11/2007 | Beyerle et al. |
| 2007/0260696 | A1 | 11/2007 | Bohannon et al. |
| 2007/0288585 | A1 | 12/2007 | Sekiguchi et al. |
| 2008/0098113 | A1 | 4/2008 | Hansen et al. |
| 2008/0183988 | A1 | 7/2008 | Qi |
| 2008/0184225 | A1 | 7/2008 | Fitzgerald et al. |
| 2009/0007121 | A1 | 1/2009 | Yamada et al. |
| 2009/0113018 | A1 | 4/2009 | Thomson et al. |
| 2010/0191884 | A1 | 7/2010 | Holenstein et al. |
| 2011/0066595 | A1 | 3/2011 | Kreuder et al. |
| 2011/0131184 | A1 | 6/2011 | Kirshenbaum |
| 2012/0016839 | A1 | 1/2012 | Yueh |
| 2012/0042030 | A1 | 2/2012 | Deshmukh et al. |
| 2012/0166390 | A1 | 6/2012 | Merriman et al. |
| 2012/0203742 | A1 * | 8/2012 | Goodman ............. G06F 16/122 707/646 |
| 2012/0246255 | A1 | 9/2012 | Walker et al. |
| 2013/0036092 | A1 | 2/2013 | Lafont et al. |
| 2013/0204991 | A1 | 8/2013 | Skjolsvold et al. |
| 2014/0108339 | A1 | 4/2014 | Marsden |
| 2014/0108341 | A1 | 4/2014 | Marsden |
| 2014/0108342 | A1 | 4/2014 | Marsden |
| 2014/0108343 | A1 | 4/2014 | Marsden |
| 2014/0108344 | A1 | 4/2014 | Marsden |
| 2014/0108350 | A1 | 4/2014 | Marsden |
| 2014/0129521 | A1 | 5/2014 | Marsden |

* cited by examiner

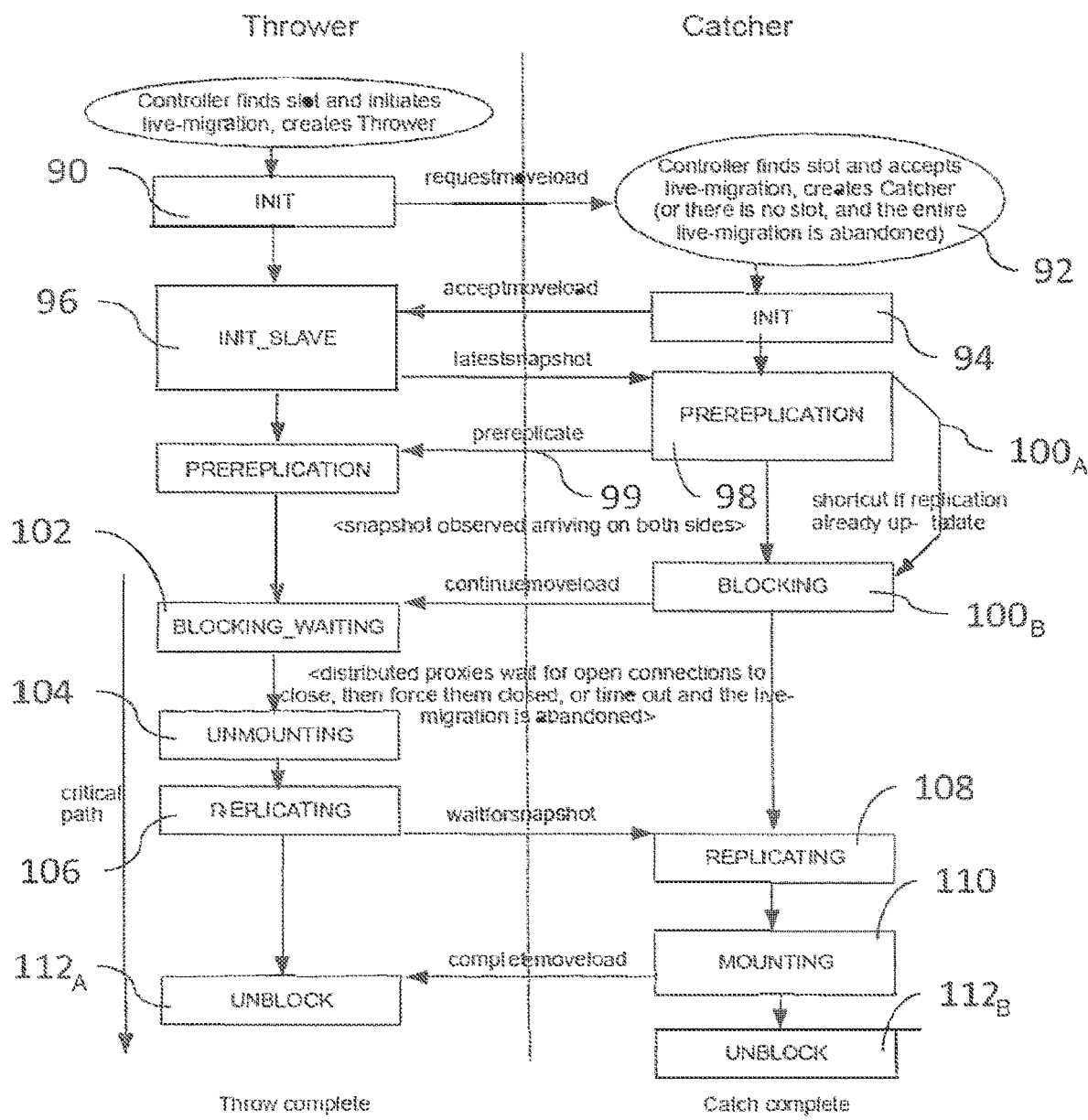

SYSTEM FOR LIVE-MIGRATION AND AUTOMATED RECOVERY OF APPLICATIONS IN A DISTRIBUTED SYSTEM

TECHNICAL FIELD

The present invention relates to managing multiple applications on a cluster of servers and particularly but not exclusively relates to mechanism and apparatus for asynchronously replicating data pertaining to a set of applications across multiple (virtual or physical) servers (a cluster) in a high-latency networked system in a partition- and failure-tolerant manner.

BACKGROUND TO THE INVENTION

For an organisation which hosts network-connected applications (including, but not limited to, companies hosting websites on the Internet), there are two key problems:
1. Components, servers, networks and storage devices can fail, in which case applications will need to be recovered, perhaps manually, from a secondary data store (such as a backup at a disaster recovery site). We will refer to this as the redundancy problem.
2. Load generated by applications can vary significantly over time, for example a website can experience a spike in traffic, so applications may need to be moved between servers in order to maintain an acceptable level of utilisation. We will refer to this as the load-balancing problem.

In the case of the redundancy problem, current solutions include:
   Adding redundancy at the physical hardware level, for example by use of dual-redundant power supplies. Disadvantages to this approach include that it is extremely difficult (i.e. expensive) to completely eliminate single points of failure within a single server, and even if this can be achieved, the system will still have a single point of failure in the operating system or other application software (e.g. the web server or kernel might crash).
   Virtualising the server and replicating every change in memory and system state to a second physical host over a high-speed LAN so that the second host can take over if the first fails, for example with VMware vMotion. Disadvantages to this approach include that virtualisation imposes a performance overhead on applications, that it requires almost the resources of two servers to run (the live one and the replica), and that the replica can only be located geographically locally. Furthermore this approach only works with a shared storage backend, which can be prohibitively expensive. Also this approach cannot be applied between datacentres or on commodity setups without high-speed connectivity between servers.

In the case of the load-balancing problem, current solutions include:
   Manually moving applications between servers when a spike of load occurs. Disadvantages of this approach include that individual servers are vulnerable to spikes in load of any of their hosted applications, which can cause all of the hosted applications on a server to crash, and the need for manual intervention which can delay recovery time significantly.
   Isolating applications which are generating large amounts of load on the system with operation-system level constraints, for example the CloudLinux kernel extensions. Disadvantages of this approach include that if an application experiences a spike in load, that application is effectively taken offline (or made to run very slowly) until it is manually moved to another server.
   The use of load balancer appliances (hardware or software) in conjunction with stateless or semi-stateless application servers and a shared storage backend (SAN), in order to distribute the load of the applications across multiple servers. We will refer to this solution as a "classical cluster". Disadvantages to this approach include that the SAN itself acts as a single point of failure, failures of which may be catastrophic, and that such a cluster cannot operate across geographically diverse regions. Further disadvantages to a classical cluster include needing to implement complex solutions for the "split-brain" problem, where servers become disconnected from each other but not from the shared storage medium, which can cause data corruption, requiring that administrators sets up quorum, fencing or STONITH ("shoot the other node in the head") to physically power off a server if it becomes unresponsive.

SUMMARY OF INVENTION

A server configured to deliver a service to at least one client connected to the server, the server operable in either of a master role or a slave role for each of a plurality of applications comprising:
   a network interface for connecting the server to at least one other similar server in a cluster of similar servers;
   service delivery logic operable when the server is in a master role for an application for hosting that application to deliver the service to the client;
   master logic operable when the server is in a master role for an application configured to replicate changes in data of that application to a configurable number of servers of the cluster;
   slave logic operable when the server is in a slave role for an application hosted on another server in the cluster configured to receive replicated changes in data from a current master server of the cluster for that application and to maintain a version of the live application data for that application;
   control logic configured to detect an event in the cluster and responsive to the event to autonomously switch the role of the server for one or more of the applications between slave and master, wherein a change of role from slave to master uses the maintained version to host the application.
   A server can host one or multiple applications—that is it can be a master server for one or more live applications. The server can also, at the same time, act as a slave for one or more live application hosted by a different server.
   It will be apparent that the phrase "between master and slave" covers a change of role from master to slave or from slave to master.
   In embodiments, the master logic may comprise a filesystem mount handler operable in a send mode to transmit the changes in data to the configurable number of servers of the cluster.
   The master logic may comprise a snapshot replicator configured to take snapshots of a filesystem serving a currently hosted application.

The master logic may comprise at least one per slave sender for replicating changes in data of a live application hosted by the server to a respective server of the cluster.

Said at least one per slave sender may be instantiated by the snapshot replicator for each slave based on the required numbers of slave servers.

The slave logic may comprise a receive replicator configured to receive the replicated changes in data and a filesystem mount handler configured in receive mode to maintain a version of the live application data.

The control logic may be configured to emit periodic heart beat signals indicating its live presence in the cluster.

The control logic may be configured to receive heart beat signals from other similar servers in the cluster, and thereby determine the live presence status of servers in the cluster.

The control logic may be configured to detect an event selected from the following:
(i) failure of current master server for an application;
(ii) a partitioning of the cluster;
(iii) a reduction in the number of servers in the cluster;
(iv) an increase in the number of servers in the cluster;
(v) introduction into the cluster of a server for which a user has expressed a preference for hosting an application;
(vi) a change in load of applications amongst servers in the cluster, such that a load rebalancing event is required.

The control logic may be configured to send and receive messages from other servers in the cluster, said messages conveying data whereby an autonomous decision can be made about the role of the server for an application.

Said messages may include binary data indicating said autonomous decision.

The control logic may be configured to detect messages from all live present servers in the cluster, and to receive messages from all such servers prior to making a decision about its role for an application.

The network interface may be operable to maintain permanent connections to the least one other similar server in a cluster whereby messages between the servers can be exchanged.

The or another network interface may be configured to establish temporary sessions for the transmission of the replicated changes in data.

The server may comprise a protocol handler operable to route requests for the service to the server when that server is hosting the live application.

According to another aspect of the present invention, there may be provided a system comprising a plurality of servers in accordance with any of the above server features.

According to another aspect of the present invention, there is provided a method of mounting a filesystem holding data for a live application at a server, the method comprising:
  prior to an event causing mounting of the application at the server, receiving changes in the live application data at the server from a current master server hosting the application and maintaining a version of the live application data;
  responsive to the event, the server recognising itself as the new master server and mounting the filesystem for the live application using its maintained version of the live application data;
  receiving requests for the application at the server and servicing the request to deliver a service using the live application.

In embodiments, the method may be used to recover from failure of the current master, and the failure may be autonomously detected by the slave which will form the new master server.

The method may be used to recover from failure of a current master server, and the failure may be autonomously detected by another server in a cluster of servers in which the master server and at least one other server is connected.

The method may be used to recover from a partition in a cluster of servers in which the current master server and at least one other server is connected, following the partition at least two servers may identify themselves as potential new master servers autonomously, and on recovery from the partition the potential new master servers may negotiate with each other and with other servers of the cluster to determine if the status of master servers should be maintained or transferred.

The method may be used to manage load in a cluster of servers in which the master server is connected, the method may comprise detecting the number of server in the cluster and their current application load, and exchanging messages with other servers in the cluster to migrate applications to balance the load.

The server may identify itself as the new master server after exchanging messages with other servers in the cluster to determine the version of the filesystem of the highest centre of mass metric, based on analysis of snapshots of changes in the live application data which have been received.

Mounting the live application may comprise instantiating a replicator sending function for sending changes in data of the newly mounted filesystem to at least one slave server in a cluster.

The current master may select the number of servers in a set from a cluster of servers as potential slave servers.

According to another aspect of the present invention, there is provided a method of managing a plurality of applications hosted by a cluster of servers which each have an interface connectable to at least one client by a network, each application delivering a service at the client, comprising:
  electing a server of the cluster as a master server, the master server hosting at least one live application;
  while the master server is hosting the live application, replicating changes in application data of the live application to a configurable number of servers in the cluster elected as slave servers whereby each elected slave server maintains a version of the application data of the live application, wherein responsive to an event in the cluster hosting of the application is transferred from the master server to one of the elected slave servers determined without intervention by a user when the event is detected, the elected slave server using its version of the current application data, to mount the application and become a new master server.

In embodiments, the event may be detection of a preferred alternate master server in the cluster based on the loads of servers in the cluster.

The event may be detection of a preferred alternate master server based on the locality of servers in the cluster.

The event may be detection of a preferred alternate master server in the cluster based on a predefined user preference.

A decision to migrate a live application from its current master server to one of its slave servers may be made when the load of the current master is greater than an average value of loads of all of the servers in the cluster and a damping factor (Q). Termed herein a "damping" factor, (or 'fudge' factor) Q is a value which prevents the servers in a cluster constantly exchanging load.

The event may be detected by exchanging messages with other servers of the cluster.

The event may be addition of a server to the cluster.

The cluster may be included in a single server prior to addition of the one server.

The event may be removal of a server from the cluster, wherein the removal was anticipated and a controlled live migration is initiated.

On addition of a server to the cluster, the new load of the servers may be determined, and a decision as to which of the applications hosted by the cluster should be migrated to the newly added server may be made.

The event may be failure of a server in the cluster, wherein the data for live applications hosted by the failed server may be recovered using versions of the current application on servers in the cluster which are continuing to operate.

The event may be a partition of the cluster, and after recovery from the partition a preferred alternate master server may be selected from a number of potentially competing master servers as the server with the version of the current application data which is more valuable.

A leader function hosted on one of the servers may determine the new master server for the application, wherein the leader function may be on a different server from the master.

According to another aspect of the present invention, there is provided a method of transferring an application from a master server, the master server receiving requests from a client for the service delivered by the application, the method comprising:

prior to an event causing a transfer, replicating changes in application state to at least one other server in a cluster;

responsive to the event, autonomously pausing incoming requests at the master server for a period in which pending requests are handled;

and after expiry of the period, in the case where pending requests are handled, routing the requests at the at least one other server where a version of application data for serving the application has been maintained.

In embodiments, when pending requests are not completed in the period, requests may not be routed to the at least one other server and the transfer of the application is abandoned.

After expiry of the period the master server may autonomously adopt a role as slave for the application which it previously hosted by instantiating a replicator receiving function for receiving replicated changes in the application data.

Multiple applications may be hosted by the master server, wherein the master server may replicates changes to a set of slave servers selected for each application.

The slave servers for each application may be selected based on at least one of load, user preference and locality.

The server may autonomously relinquish its role as master server based of detection of a preferred alternate master server in a cluster of servers.

According to another aspect of the present invention, there is provided a method of hosting an application at a server, the server receiving requests from a client for the service delivered by the application, the method comprising:

determining the number of modifications to a filesystem supporting the application in an interval;

taking successive snapshots of the filesystem at configurable points-in-time, wherein the points-in-time depend on the number of modifications to the filesystem in the interval; and sending snapshots to a replicator for transmission from the server.

According to another aspect of the present invention, there is provided a method of managing snapshots of a filesystem, where the filesystem is replicated across multiple servers connected in a cluster comprising:

identifying each snapshot by a snapnode object in the form of a binary sequence comprising a snapshot identifier, a parent pointer to an earlier snapshot on a specific server where the snapshot was taken, and the set of servers where this snapshot is presently stored;

storing a graph of snapnode objects of a set of snapshots of a filesystem on each of the multiple servers, one of the servers being an active master of the file system;

the active master taking a new snapshot of the filesystem and creating a snapnode object for the new snapshot identifying the active master as a server where the new snapshot is stored;

transmitting the new snapshot to the other servers of the multiple servers; and modifying the snapnode object to identify the other servers as servers where the new snapshot is stored.

In embodiments, the method may be used to manage recovery of a file system after an event in which the active master is to confirm or modify its status.

The event may be the partitioning of a cluster of servers in which the active master and the other servers are connected, wherein after recovery from the partition there may be at least two candidate master servers, each with a graph of snapnode objects for the filesystem, wherein the graph at each candidate master may be traversed to assess its value, and the candidate master with the graph indicating a highest value may adopt a role as new master for the filesystem.

Prior to executing the comparison, the snapshot data may be globally synchronised across the servers, whereby divergence of a version of the data at each candidate master may be assessed against the globally synchronised snapshot data.

The event may be loss of at least one other server of the multiple servers, which was acting as a slave server to the active master, wherein after a replacement slave has been designated by a master, the master may instruct the new slave to replicate a complete current of the filesystem so that replication can begin from a current point.

The method may comprise a step of saving snapshots from a given slice point in the graph to a local storage area.

The method may comprise a step of pruning a snapshot.

The method may comprise a step of determining which action to take in order to resolve a divergence of graphs on multiple servers representing the same filesystem based on:

(1) a current master for the filesystem;

(2) a graph of snapnode objects for that filesystems global state;

(3) a list of current slave servers to that master for that filesystem.

The snapshot identifier may identify the time at which the snapshot was taken and the server on which the snapshot was taken.

In embodiments of any of the above servers or methods, a user interface may be presented to a user for permitting access via a user to snapshots selected by a user.

According to another aspect of the present invention, there may be provided a method of balancing load in a cluster of servers hosting a plurality of applications, the method comprising:
- determining the current load of each server;
- determining an average load taking into account the loads at the servers in the cluster;
- determining for a server whether its load is less or greater than the average load plus a damping factor (Q);
- making a decision to migrate an application from the server when its load is greater than the average plus the damping factor.

According to another aspect of the present invention, there may be provided a computer program product comprising a computable readable medium on which is stored a set of computer instructions which when executed by a processing means performs operations in accordance with any of the above server or method features.

Embodiments of the invention provide a mechanism and apparatus for both mediating access to the hosted applications and controlling the aforementioned data replication to enable the applications to be seamlessly live-migrated between servers in response to changing load and topological preferences of each application.

Embodiments of the inventions provide a stashing capability. In general terms, stashing occurs when a filesystem diverges (which for example can be due to a network partition, or pruning occurring while a slave server was offline leaving the latest snapshot on a failed and re-introduced slave no longer a valid slice point for a new replication)—and results in part or all of a filesystem on a slave receiving a replication being stashed into a special local storage area called "the stash" rather than the main storage area where live filesystems live.

According to another aspect of the present invention there is provided a system for dynamic migration of applications between servers, the system comprising a plurality of servers for hosting applications, each of the plurality of servers comprising a protocol handler for receiving requests for applications, wherein the protocol handler is configured to pause incoming requests for an application during migration of applications between servers.

The system may further comprise a load balancer for measuring load on one of the plurality of servers caused by one or more applications hosted on that server, the load balancer being configured to initiate migration of one or more applications from the measured server to another server when a predetermined load condition of the measured server is met.

The plurality of servers may each have a controller that maintains a record of the server on which an application is currently hosted, and the protocol handler is configured to inspect the record to determine the server to which an incoming application request is to be directed.

The protocol handler may be configured to pause incoming requests for an application and to terminate current requests for an application after a predetermined time period.

Additionally or alternatively, the protocol handler may be configured to pause incoming requests for an application for a predetermined time period and to release the paused requests if current requests for an application have not completed in the predetermined time period.

According to another aspect of the invention there is provided a method for replicating a filesystem between a first server and a second server prior to and following a partition between the first server and the second server, the method comprising: at the first server, taking snapshots of a current state of the filesystem at predetermined points in time following modification of the filesystem, each snapshot recording differences between the current state of the filesystem on the server and the state of the filesystem on the server at the time point of a previous snapshot; continually replicating the snapshots taken on the first server to the second server as soon as they are taken; upon detection of a partition, both the first and the second server becoming masters for the filesystem and accepting new modifications to the filesystems; after recovery of the partition, performing an update process to update the filesystem, the update process comprising: identifying which of the first server and the second server contains the most current version of the filesystem; nominating the server so identified as the master server and the other server as the slave server; identifying a snapshot that is common to both the master server and the slave server; and replicating subsequent snapshots from the master server to the slave server.

Identifying which of the first server and the second server contains the most current (i.e. most valuable) version of the filesystem may comprise calculating a centre of mass metric for the version filesystem on each of the servers, the centre of mass metric representing the average age of the snapshots of the filesystem on each server and the number of changes to the filesystem represented by the snapshots on each server.

Identifying which of the first server and the second server contains the most current (i.e. most valuable) version of the filesystem may further comprise identifying a set of snapshots of the filesystem that for each server, each set of snapshots containing snapshots only present on that server, and calculating the centre of mass metric for each server based on that server's set of snapshots.

The update process may further comprise storing the snapshots of the slave server that were taken after the common snapshot.

According to another aspect of the invention there is provided a system for replicating a filesystem between a first server and a second server prior to and following a partition between the first server and the second server, the system comprising: snapshotting means for taking snapshots of a current state of the filesystem on the first server at predetermined points in time following modification of the filesystem, each snapshot recording differences between the current state of the filesystem on the server and the state of the filesystem on the server at the time point of a previous snapshot; replicator means for continually replicating the snapshots taken on the first server to the second server as soon as they are taken; detection means configured such that upon detection of a partition, both the first and the second server become masters for the filesystem and accept new modifications to the filesystems; updating means configured to perform an update process to update the filesystem after recovery of the partition, the update process comprising: identifying which of the first server and the second server contains the most current version (i.e. most valuable) of the filesystem; nominating the server so identified as the master server and the other server as the slave server; identifying a snapshot that is common to both the master server and the slave server; and replicating subsequent snapshots from the master server to the slave server.

Identifying which first server and the second server contains the most current (i.e. most valuable) version of the filesystem may comprise calculating a centre of mass metric for the version of the filesystem on each of the servers, the centre of mass metric representing the average age of the snapshots of the filesystem on each server and the number of changes to the filesystem represented by the snapshots on each server.

Identifying which of the first server and the second server contains the most current (i.e. most valuable) version of the filesystem may further comprise identifying a set of snapshots of the filesystem that for each server, each set of snapshots containing snapshots only present on that server, and calculating the centre of mass metric for each server based on that server's set of snapshots.

The update process may further comprise storing the snapshots of the slave server that were taken after the common snapshot.

The system may further comprise storage means for storing the snapshots taken of the filesystem such that a previous snapshot of the filesystem can be selected by a user from the stored snapshots to restore the system to its state at the time of the selected snapshot.

The previous snapshot of the filesystem may be selectable by means of a user interface presented to the user.

According to another aspect of the invention there is provided computer software which, when executed by appropriate processing means, causes the processing means to implement the systems and methods of the first, second and third aspects of the invention.

BRIEF DESCRIPTION OF THE DRAWINGS

Embodiments invention will now be described, strictly by way of example only, with reference to the accompanying diagrams, of which:

FIG. 9 is a schematic representation of the live-migration state machine transitions

DESCRIPTION EMBODIMENTS

Terminology

Figure 1:
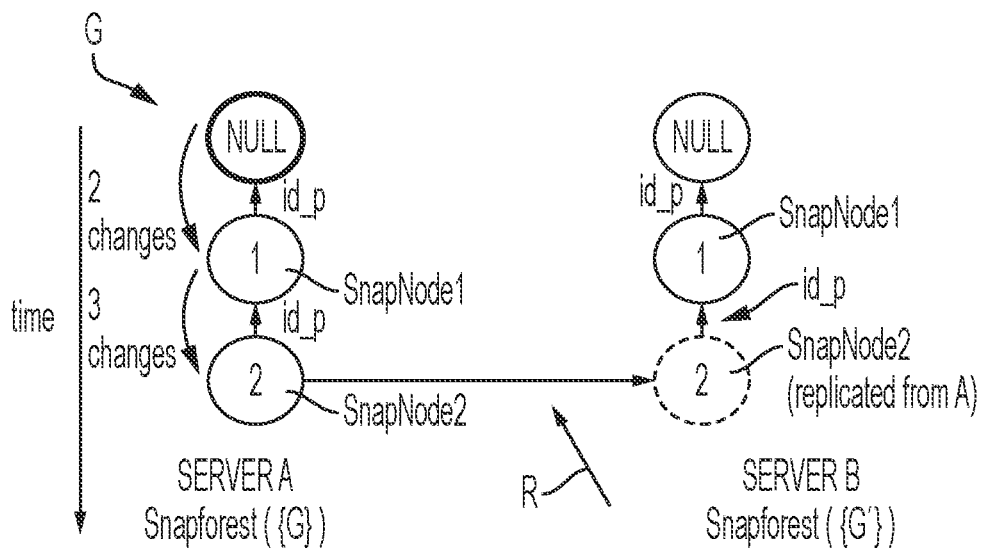
FIG. 1 is a schematic representation of a first server A replicating a snapshot 2 to a second server B, which already has a snapshot 1.
Figure 1A:
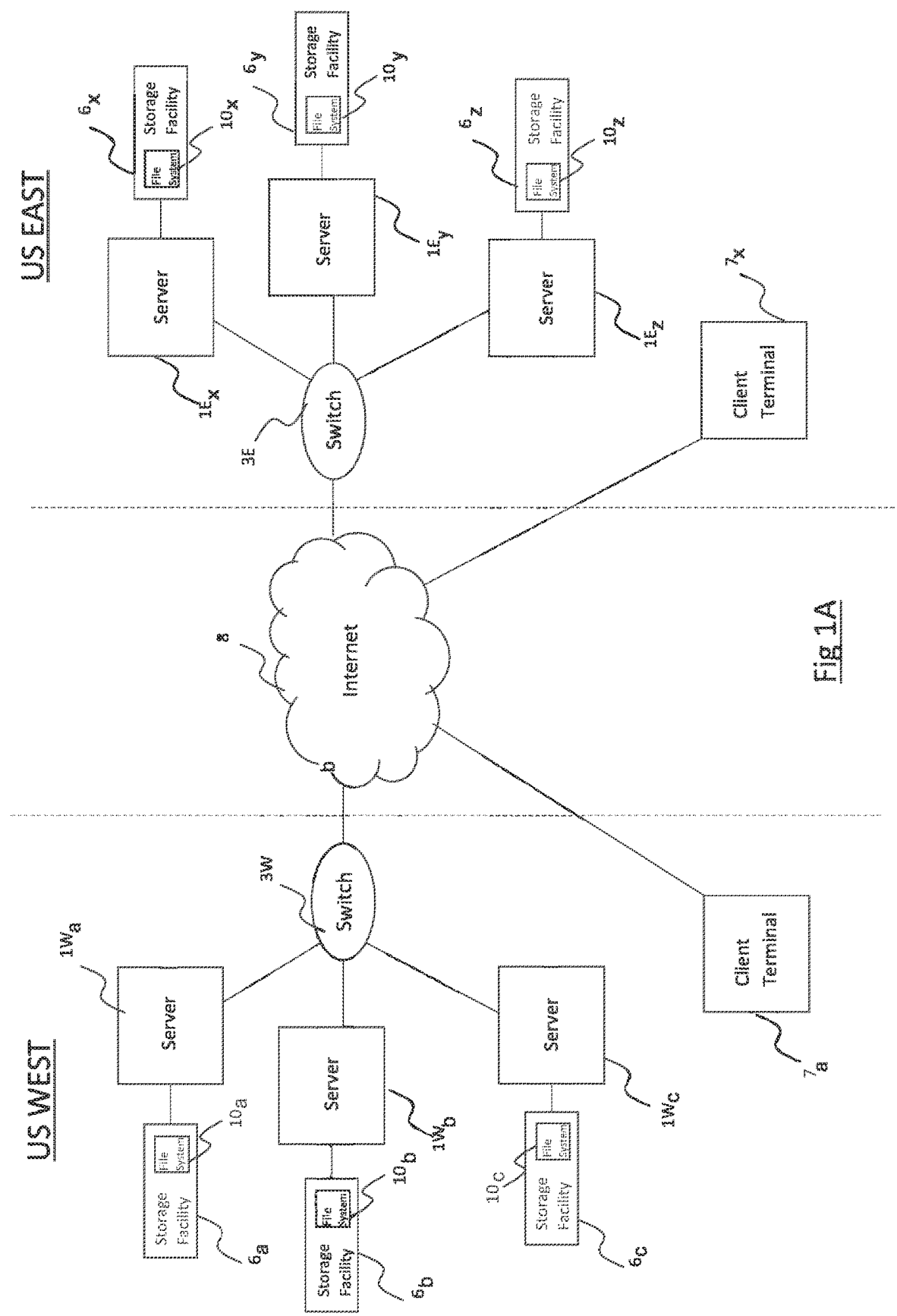
FIG. 1A is a schematic block diagram of a cluster of servers hosting multiple applications.

FIG. 1a illustrates a schematic architecture of a computer system in which the various aspects of the present invention discussed herein can usefully be implemented. It will readily be appreciated that this is only one example, and that many variations of server clusters may be envisaged (including a cluster of 1).

FIG. 1A illustrates a set of servers 1 which operate as a cluster. The cluster is formed in 2 subsets, a first set wherein the servers are labelled 1Ex-z and a second set wherein the servers are labelled 1Wa-c. The subsets may be geographically separated, for example the servers 1Ex-z could be on the east coast of the US, while the servers labelled 1Wa-c could be on the west coast of the US. The servers 1Ex-z of the subset E are connected by a switch 3E. The switch can be implemented in any form—all that is required is a mechanism by means of which each server in that subset can communicate with another server in that subset. The switch can be an actual physical switch with ports connected to the servers, or more probably could be a local area network or intranet. The servers 1Wa-c of the western subset are similarly connected by a switch 3W. The switches 3E and 3W are themselves interconnected via a network, which could be any suitable network for spanning a geographic distance. The internet is one possibility. The network is designated 8 in FIG. 1A.

Each server is associated with a local storage facility $6a$-$c$; $6x$-$z$ which can constitute any suitable storage, for example discs or other forms of memory. The storage facility $6a$-$c$; $6x$-$z$ supports a file system $10a$-$c$; $10x$-$z$. The file system $10a$-$c$; $10x$-$z$ supports an application running on the server 1 which is for example delivering a service to one or more client terminal 7 via the internet. Embodiments of the invention are particularly advantageous in the field of delivering web-based applications over the internet. Embodiments of the invention are also useful to support an email server, with the benefits discussed herein, where the filesystems support mailboxes.

The servers and associated file systems are substantially similar or homogenous, in the sense that each can operate autonomously as master or slave, depending on the elected mode.

Defining Objects:

Each client 7 can launch a software program, such as a web browser, for accessing an application (or database) delivered by one of the servers. The server hosting the application communicates with the client for example to deliver a web page using HTTP protocol. Herein the term application is intended to cover any active software or datastructure at a server capable of being accessed by a client, and specifically, but without limitation, covers programs, databases and email (mailbox) or other messaging structures.

In this description we make use of basic mathematical symbols, including:
A:=definition
Sets:
{1, 2, 3} for unique elements 1, 2, 3
Mappings:
[1→A, 2→B] for unique keys 1, 2
Ordered tuples:
(1, 2, B) which may be of differing types
Compound type definitions (named tuples):
Type(A, B, C)
Assumptions
We assume the existence of two underlying systems which embodiments of the present invention depends on:
1. A filesystem $10a$-$c$; $10x$-$z$ local to each server which can contain arbitrarily many subfilesystems (one for each application or database). Note that in the following, a filesystem supports an application or database and there can be more than one per server, i.e., a sub-file system is hereinafter referred to as a "filesystem". The filesystem can comprise any suitable storage, e.g., discs. Each filesystem can have arbitrarily many consistent point-in-time snapshots, each named with a locally unique string, and furthermore there is a mechanism to replicate the difference between two snapshots from one machine to another. One example of a filesystem which satisfies these requirements is the open-source ZFS filesystem. As more fully described herein, embodiments of the invention use this capability of the filesystem to replicate a difference from one server to another to allow servers to autonomously migrate applications/databases. Strictly by way of example, on server A there might be filesystem F which has snapshots {1, 2, 3} and on server B there might be snapshots {1, 2} of the same filesystem. Note that a snapshot does not have to be stored and transmitted as an entire bit image of the filesystem—the filesystem allows us to replicate the difference between snapshot 2 and 3 (e.g. only the blocks on disk which have changed) to bring server B up to date so that it contains snapshots {1, 2, 3}. However, in the following embodiments although it is convenient to transmit only differences, full images could be transmitted.

2. A group messaging service GMS supported by the network 8 which allows messages M1, M2 . . . Mn to be sent between servers in the cluster. Crucially, the group messaging service provides certain guarantees about messages which are broadcast to the group: even over lossy, high-latency network links, message delivery is guaranteed to all currently active members of the group, and message ordering is logically consistent across all servers. Strictly by way of example, if server A sends one message to the group, and simultaneously server B sends another message, all the members of the group, including A and B will receive the messages in the same order. One example of a group messaging system which satisfies these requirements is the open-source Spread Toolkit.

Figure 1B:
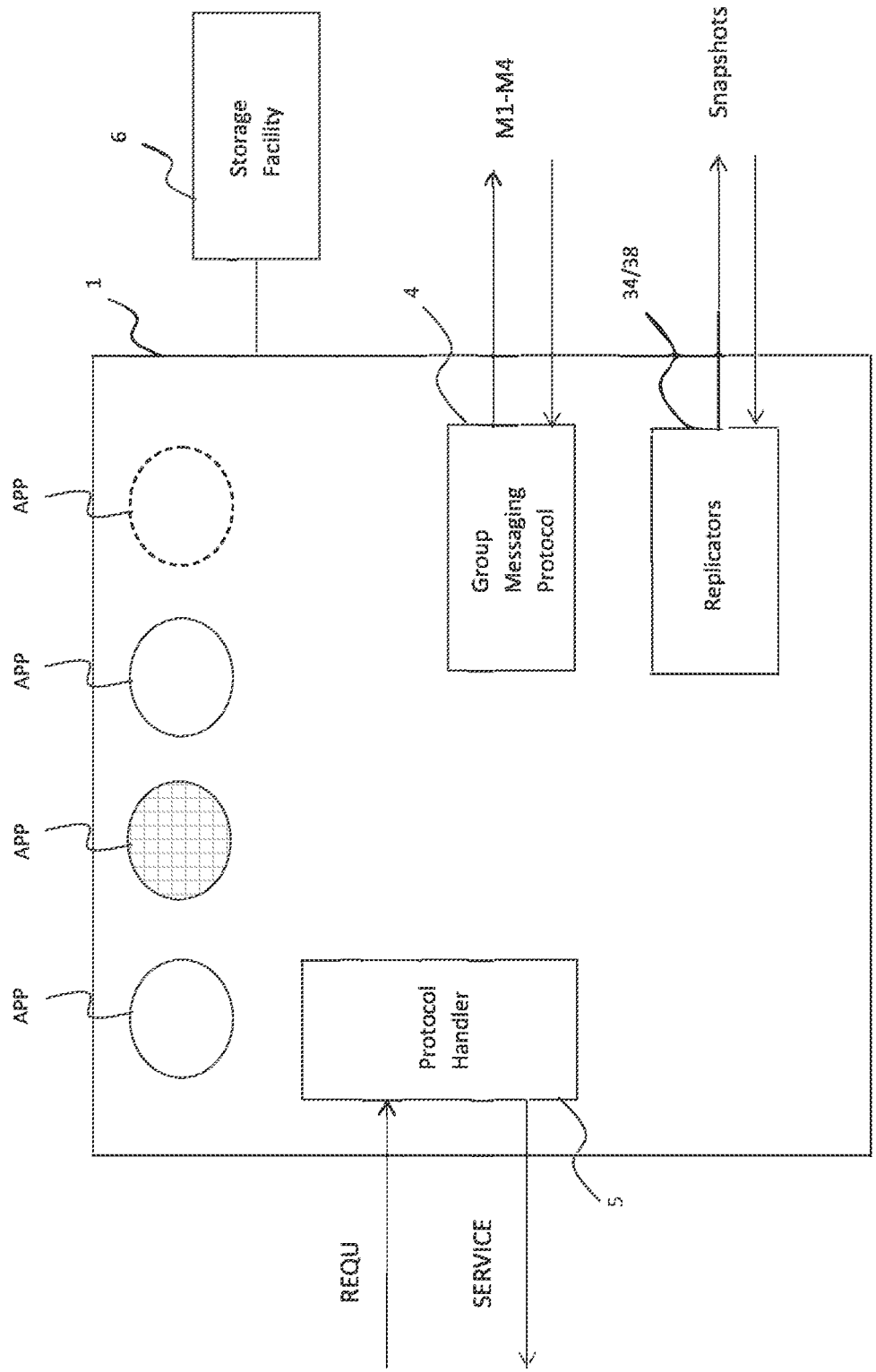
FIG. 1B is a schematic diagram of a server.

FIG. 1B is a schematic diagram of a single server 1. The server comprises a processor suitable for executing instructions to deliver different functions as discussed more clearly herein. In addition the server comprises memory (not shown) for supporting operation of the processor. This memory is distinct from the storage facility 6 supporting the file system 10. As will readily be understood from the following, a server 1 can be supporting multiple applications at any given time. These are shown in diagrammatic form by the circles labelled app. The app which is shown cross-hatched designates an application which has been newly mounted on the server 1 as a result of the application migration processes discussed later. The app shown in a dotted line illustrates an application which has just been migrated away from the server 1. The server 1 supports a protocol handler 5 which co-operates with similar protocol handlers of other servers in the cluster to provide a distributed protocol handler mechanism discussed more fully herein. The server 1 also supports a group message protocol 4. The protocol handler 5 receives requests from the client terminal 7 over the network 8 and is responsible for routing requests to the application to which the request is addressed, and for returning to the client service data provided from the application for delivering the service to the client 7. The group messaging protocol 4 is responsible for exchanging messages m1 to m4 with other servers of the cluster. Note that these messages can be exchanged locally through the local switches 3E/3W and/or remotely via the network 8. The server 1 also supports sending and receiving replicators 34/38 which are responsible for sending and receiving snapshots of application data on the file system supporting the application. Note that FIG. 1B is highly schematic, particularly in the sense that the server 1 may have a single or multiple ports over which all the internal and external communication paths are provided. Thus, although it is possible to provide dedicated ports for delivery of the service to the client terminals, the message exchange, and the receipt and delivery of snapshots, this is not necessary and this could all happen over the same physical port of the server. Note at this juncture that the relationship between the server 1 and the storage facility 6 is not discussed further herein, because any suitable file system arrangement could be used. Therefore, although shown as a separate module it is possible to integrate the file system storage facility within the server if desired or necessary.

It will be appreciated that the structure and functions defined in the following can be implemented in any suitable combination of hardware, firmware or software. In particular, the functions can be implemented by suitable code running on the processor of the server. Thus, when used herein the term module does not necessarily mean a separate physical module, but can also imply an architectural description of a set of instructions providing a particular function.

Overview

During normal operation, the system will elect one master server for each application, so that each application is hosted on precisely one server in the cluster. Changes which occur to that application on the master are asynchronously replicated to n slave servers for that filesystem for n+1 total copies of the filesystem. This makes the system n redundant as it can tolerate the failure of n servers. Changes to the application are changes in the application or database state (data) as recorded in the filesystem for that application while it is live.

Replication System

SnapshotGraphForest Data Structure

The cluster's ability to perform data replication between servers under arbitrary failure and partition conditions is provided in this example by the SnapshotGraphForest. This data structure represents the global state of a given filesystem across all servers in the cluster.

We begin with the simple case of a cluster with one filesystem F.

FIG. 1 represents server A replicating a second snapshot 2 to server B, which already has a snapshot 1. Server A is the master server hosting the application of filesystem F, and is replicating changes in state to at least one elected slave server B.

A snapshot graph forest is a set of snapshot graphs G. A snapshot graph is a directed acyclic graph (DAG) of snapshot nodes. A snapshot node is a specific, globally unique version of a filesystem, including a set of parent edges, which identifies that snapshot node's position in the graph.

The graph is a DAG because a snapshot node can have multiple parents and also multiple children. It's acyclic because parent snapshots are always older than child snapshots, so a cycle in the graph can never be formed.

Each snapshot node is defined by an object type SnapNode(id, [id_p→(srvs, count, imm)]) where id is the globally unique snapshot identifier, id_p is the parent pointer which refers to the id of the earlier snapshot on a specific server on which this snapshot is held (this may be NULL if it is the first snapshot, in which case it is said to be based on the origin), srvs is the set of servers on which the snapshot is presently stored, count represents the number of filesystem modifications captured by the snapshot with respect to its parent snapshot, and imm represents whether the given snapshot is immutable (whether it may be deleted) on the given server. We will ignore imm until we discuss pruning later. The snapshot identifier identifies where (the host server) and when (a timestamp) the snapshot was taken.

Observe that a SnapNode object can represent the state of the filesystem on multiple servers at once, and capture the fact that on different servers, the parent snapshot of each snapshot may differ, even though the data the snapshot captures is identical.

A snapshot graph is defined as SnapGraph(set of snapshot nodes) where all the snapshot nodes in a graph are reachable via the parent and child pointers of those nodes.

In the example in FIG. 1, before a replication denoted by arrow R, there is a graph G in the forest:

G:=SnapGraph({SnapNode(1, [NULL→({A,B}, 2]),
  SnapNode(2, [1→({A}, 3])})

Snapshot 1 is an initial snapshot which is stored on both A and B with two changes recorded between the origin and the snapshot, and snapshot 2 is based on (has a parent of) snapshot 1 and has a copy only on server A. The changes are recorded in filesystem F as a result of the live application executing at server A.

The complete snapshot graph forest for this configuration is SnapForest({G}). That is, there is only one graph G in this forest (there are no completely disconnected sets of snapshot nodes, or, all nodes are connected to all other nodes).

After the replication of snapshot 2 onto B, the graph G' has the new state:

```
G' := SnapGraph ({
    SnapNode(1, [NULL → ({A, B}, 2]),
    SnapNode(2,[1 → ({A, B}, 3)])
})
```

Note that B now has a copy of snapshot 2, indicated in bold above.

Diverged Graphs

Figure 2:
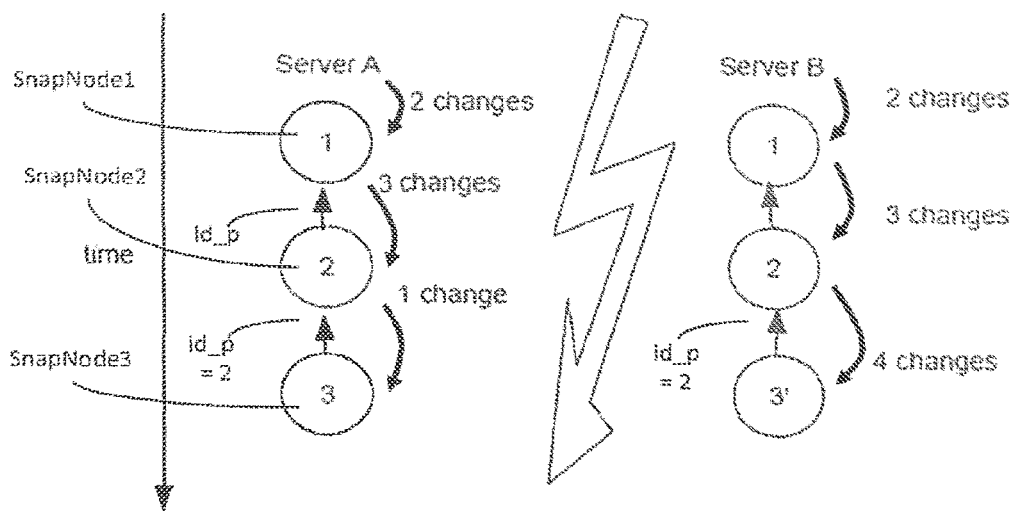
FIG. 2 is a schematic representation of the replication of FIG. 1 with a network partition and a divergence.
Figure 2A:
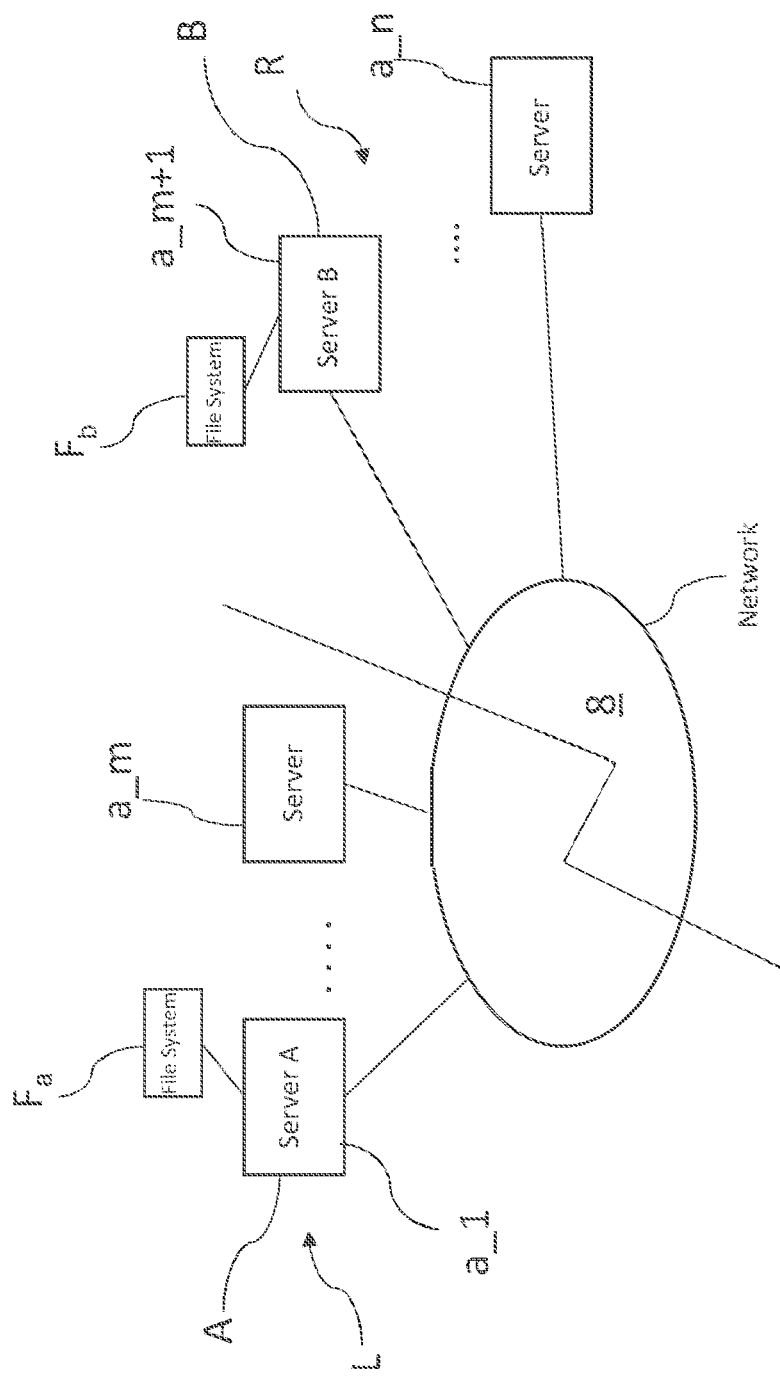
FIG. 2A is a schematic diagram of a partitioned cluster.

FIG. 2a illustrates a partitioned cluster of servers.

Consider that a cluster may become partitioned from a
  server group of a set of servers {a_1, . . . a_m, a_m+1, . . . , a_n} for n>m, into two server groups L: {a_1, . . . , a_m}, R:
  {a_m+1, . . . a_n}. In fact a failure may cause arbitrarily many partitions, but we describe the two-partition case, which generalises to arbitrarily many partitions.

Observe in fact that that all failures can be generalised to partitions, for example the failure of a single server a_i can be considered as the partition into the groups {a_j|j!=i} and {a_i}. The failure of a network switch can be considered as a partition into num-ports many groups each containing a single server.

During a partition, all sides of a partition elect new masters for all available filesystems. Now the data on both sides of the partition may begin to diverge as changes get made to the filesystems on both sides of the partition.

FIG. 2 shows the same cluster as before but with a network partition. Now servers A and B cannot talk to each other, and so they both elect themselves as the new master for the filesystem F in question. Both servers then might observe modifications (changes) to their filesystem F and server A might take snapshot 3, which captures I modification, and server B might take snapshot 3' which captures 4 modifications. The global state of the SnapshotGraphForest for this system is now:

```
G := SnapGraph({
    SnapNode(1, [NULL → ({A, B}, 2)]),
    SnapNode(2, [1 → ({A, B}, 3)]),
    SnapNode(3, [2 → ({A}, 1)]),
    SnapNode(3', [2 → ({B}, 4)]),
})
```

That is, there are now four SnapNode objects, one for each distinct filesystem state captured by the system. Since snapshots 3 and 3' both have snapshot 2 as a parent, the filesystem state is said to have diverged. Note that only after the network partition is recovered and A and B can communicate again that they can discover this complete graph by sending messages which include their filesystem state.

We will now consider one final example which demonstrates why it might be necessary to be able to express a forest of completely disconnected graphs. Suppose servers A and B remain disconnected and users on both sides of the partitions happen to add a filesystem G with the same name on both sides of the partition. Suppose then the system takes initial snapshots:

S1 := SnapNode(l, [NULL (A, 2])    on A's side of the partition
S2 := SnapNode(l', [NULL (B, 3))   on B's side of the partition Now the resulting snapshot graphs will not be connected, and therefore the forest contains two disconnected graphs:

SnapForest({SnapGraph({S1}), SnapGraph({S2})})

Multiple graphs can also be caused by one server A being offline for long enough that the other server B has deleted all the common snapshots of the filesystem by the time A comes back online.

Sometimes it is useful to refer to a local forest which contains only information about a filesystem on a specific server. Observe that a local forest is always a forest which contains a single linear graph with no divergences because a filesystem on a single server must always have a linear structure of snapshots from the earliest to the latest.

Finally a note on the snapshot identifiers (id). These are defined as tuples SnapId(timestamp, server) where the timestamp is the number of milliseconds since the UNIX epoch and the server is the globally unique primary IP address of the server which took the snapshot. Note the distinction between the SnapId's server field which describes where the snapshot was originally taken, and the SnapNode's srvs field which indicates where copies of the snapshot are presently stored.

Exploring a SnapshotGraphForest: Calculating Divergences, Heads, Centre of Mass, Candidate Masters, and Finding Updates Given a global snapshot graph forest representing the present global state of a filesystem on a cluster, the aim of the system is to perform operations on the local filesystems on each server in the system in order to return to a globally consistent state where replication of changes from master to slaves may continue.

The operations which we can perform on filesystems (known as manipulator operations) are:
 1. Snapshot: Take a new snapshot.
 2. Send: Send incremental snapshot(s) or a complete filesystem from one server to another.
 3. Receive: Receive snapshots (either an incremental update or a complete replication stream) sent from a master server onto a slave server.

4. Stash: Stash (save) snapshots from a given "slice point" to a local stashing area.
5. Prune: Prune (delete) a snapshot.

Here we describe a process which can be used for detecting divergences and deciding which actions to perform. An important action is to determine, responsive to a disruptive event such as failure or partition, how to elect a new master server for a live application so that it continues without significant interruption.

First we define a traversal function, which, given a starting node (a snapshot identifier), visits each SnapshotNode in its connected graph via its parent and (deduced) child pointers. It constructs mappings of child and parent pointers and then performs a search of the graph accessible from the starting node, remembering which snapshots it has already seen to avoid loops.

From this we can define a graphs function, which given a set of SnapNode objects, removes a SnapNode from the set and adds its complete graph to the set of graphs until there are no SnapNode objects remaining, thereby taking an unstructured set of snapshot nodes to a set of snapshot graphs by establishing which nodes are interconnected.

Now we can define a heads function, to calculate which snapshots in a given graph are the competing most recent versions of each filesystem, the "heads" of the divergences. Given a graph as calculated by graphs, the heads of that graph are precisely the elements of the graph which have zero children in the graph.

We can define a restricted graph with respect to a server as the set of snapshot nodes restricted to the snapshots which have a copy on a given server. So in diagram 2, the complete graph is {1, 2, 3, 3'} but the graph restricted to server A is {1, 2, 3} and the graph restricted to B is {1, 2, 3'}. Note that snapshot nodes in a restricted graphs only ever have one parent edge.

Now we can define a centreOfMass function on a restricted graph, which calculates a weighted sum: a time-like value which is the average timestamp of all of the snapshots in the restricted graph, weighted by the number of modifications in that node's single parent edge. Intuitively, a graph with a more recent centre of mass is more valuable than a graph with an older centre of mass, because the more recent centre of mass corresponds to more recent and more significant changes.

This is the formula which can be used to calculate the centreOfMass of a graph G restricted to a server A:

$$\mathrm{tail}(G|_A) = \{g \in G|_A \cdot g \neq \mathrm{first}(G|_A)\}$$

$$centreOfMass(G|_A) = \frac{\sum_{tail(G|_A)} \mathrm{weight}(g) \times (\mathrm{time}(g) + \mathrm{time}(\mathrm{parent}(g))) \times \frac{1}{2}}{\sum_{tail(G|_A)} \mathrm{weight}(g)}$$

First we define the tail of a restricted graph simply as all the snapshots in that graph which are not the first snapshot. This is because the midpoint of each snapshot node g and its parent is only defined when parent(g) is not the origin. Then we can define the centreOfMass of a restricted graph as the sum over the snapshots in the tail of the graph of the midpoint in time of that snapshot and its parent, weighted by the weight of each snapshot (number of changes between that snapshot and its immediate parent), divided by the total weight of the tail of the graph.

By way of example, consider which of the restricted graphs in diagram 2 have the highest centre of mass: the graph restricted to A has centreOfMass (3*(2+1)*0.5+1*(3+2)*0.5)/(3+1)=1.75 whereas the graph restricted to B has centreOfMass (3*(2+1)*0.5+4*(3+2)*0.5)/(3+4)=2.071. Intuitively, the graph restricted to B wins, and B should be elected the new master (because its data captures a greater weight of recent changes). Note that we do not count the weights between snapshot 1 and the origin, but this does not matter as it is equal in both cases.

To formalise this intuition, we define a chooseCandidateMasters function which allows the system to handle the case where two or more servers have become competing masters for a filesystem due to a network partition. When the network partition recovers, the servers observe that they are in competition by exchanging lists of which filesystems each server thinks it is the master for, and which they are not (called a current masters message) and furthermore they exchange the snapshot data necessary to construct the global forests to decide which server should continue to be the master.

The chooseCandidateMasters function operates as follows: given a graph, it calculates the set of servers which are involved in the graph (i.e. which have a copy of any snapshot node in the graph), and for each such server, calculates the restricted graph for that server. For each restricted graph, it calculates the centre of mass of that restricted graph, and finally it returns the set of servers which tie at the maximum centre of mass.

When the servers detect that both of them are currently the master, by inspection of their current masters messages, they both run the chooseCandidateMasters function based on the globally synchronised snapshot data; whichever server discovers that it is the best candidate master asserts ownership of the site and the other servers cede to the new master (they become slaves). If they tie, one is elected at random by the server with the lexicographically lowest IP address.

If a master observes that a slave has a completely disconnected (separate graph), it compares the weights of the disconnected segments, and the winning side (new master) instructs the losing side (new slave) to completely stash this entire filesystem so that replication can begin from scratch. That is, if there is no common snapshot between a master and a slave (the graph is "completely disconnected") then the slave must stash the entire filesystem and the master must replicate the entire history, from the NULL snapshot all the way to the latest snapshot.

Now we can define a process findUpdates which, given as arguments 1. a server which has been elected as master, 2. a complete SnapshotGraphForest for that filesystem's global state, and 3. a list of slave server names, decides which actions to take in order to resolve divergences and allow normal replication to continue on those slaves. The findUpdates function works by using the traverse function to start at the current master's most recent snapshot id (master_head), working backwards visiting each (parent, child) pair. As soon as it finds a common snapshot with any slave, it knows that the parent is the "slice point" for that slave, so it records the update slave→(snapshot_id, master_head).

The output of findUpdates therefore is a set of replication actions:

{slave→(start_snapshot_id, end_snapshot_id)}

This corresponds to the actions needed to be taken to bring the slaves (machines which have any copy of a filesystem with the same name, and which may have some common snapshots on which base a replication) up to date with the master, possibly resulting in the slaves needing to stash some data in case their data was diverged, in which case the start_snapshot_id corresponds to a non-head snapshot on the slave. Otherwise, it is the most recent ("head") snapshot on the slave, and the replication event is known as a simple "fast forward" update.

The starting and ending snapshot nodes can be more than one arc edge apart from each other in the graph because the underlying filesystem is capable of sending more than one snapshot in a single replication event.

In the unlikely case that there are no divergences but the given master has an earlier head snapshot than the slave, (i.e. the snapshots on the slave up to the first common snapshot are a strict superset of the snapshots on the master) the master is respected and the slave is instructed to stash the filesystem up to the point at which the master can continue replicating. This special case is expressed as an update where start_snapshot_id and end_snapshot_id are identical. This should not occur in practice.

The master runs the findUpdates function and sends the result, for each slave, as an instruction (a replicate message) to the slave to begin a replication. Now we will cover the details of how the replication proceeds in terms of state transitions between the participating components on the master and its slaves.

Stashed data may optionally be offered to the user in case they wish to recover data from the losing side of the partition.

Replicators
Overview

Figure 3:
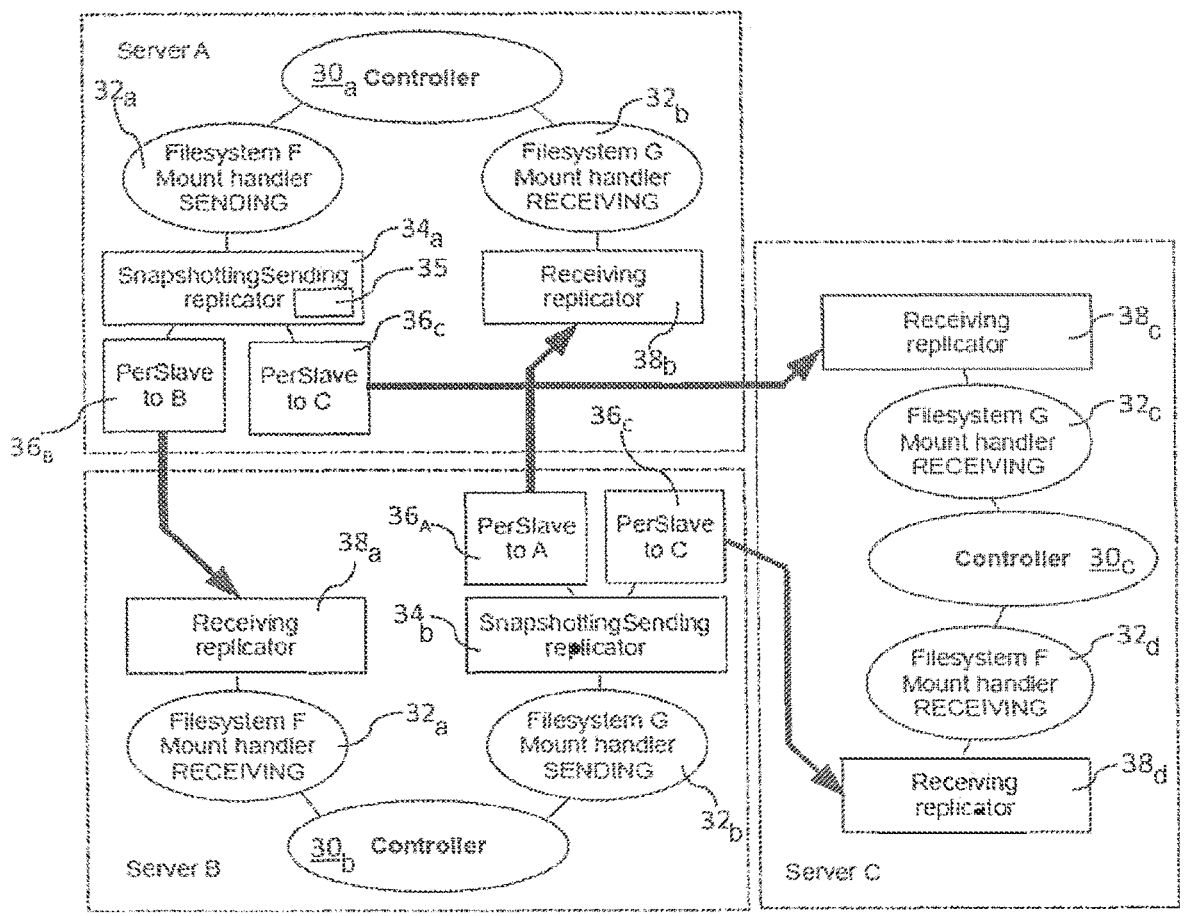
FIG. 3 is a schematic representation of an example replication system configuration where there are three servers A, B and C and two filesystems, F and G.

As shown in FIG. 3, there are five types of objects which participate in the mounting, unmounting and snapshotting of filesystems, replication of data to slaves, and pruning of snapshots. These objects can be implemented as software in suitably programmed processors, in hardware, firmware, state machines or in any other way.

1. Controllers 30a-c, of which there is exactly one per server. A controller 30a-c is responsible for synchronising global state across all the servers, electing masters, adding and removing slaves, and brokering communication between the state machines and the group messaging protocol. It also implements load-balancing in terms of live-migration.
2. Mount handlers 32a-d which handle safely mounting and unmounting a filesystem. These exist on both masters and slaves, one per filesystem.
3. Snapshotting replicators 34a-b, which exist on a master (one per filesystem), which receives notifications that a filesystem has been modified and decides when to take new snapshots.
4. Per-slave sending replicators 36a-c, which exist on a master (one per slave per filesystem) and which communicate over the group messaging protocol 4 to receiving replicators 38a-d (via the controller [note FIG. 3 does not illustrate this pathway]) in order to mediate the transmission of snapshot data from master to slave according to the results from the Snapshot-Graph findUpdates function.
5. Receiving replicators 38a-d, which communicate with the per-slave sending replicators to mediate the receipt of snapshot data from master to slave.

FIG. 3 shows one possible configuration where there are three servers A, B and C and two filesystems, F and G. This diagram corresponds to a currenlMas1ers mapping of:

[F→server A,
G→server B]

In this example, Server A is the master for filesystem F and server B is the master for filesystem G. Server C is a slave for both filesystems, and the cluster is configured to replicate filesystem data to two slaves per filesystem. The heavy lines in FIG. 3 represent the flow of filesystem snapshot data.

Controllers and Mount Handlers

Each controller 30a-c has a filesystem mount handler 32a-d per filesystem, and each filesystem mount handler is in one of two states, RECEIVING or SENDING. If a mount handler 32a-d is in RECEIVING, its filesystem (e.g., G in server A) is unmounted and it has a receiving replicator 38a-d. If a mount handler is in SENDING, its filesystem is mounted (e.g., F in server A) and it has a sending replicator 34a-b. Changes are actively made by the application to that filesystem F, snapshots are made of it by the snapshotting replicator 34a-b, and the sending replicator's per-slave replicators e.g. 36B, 36C, one per slave, are responsible for sending the snapshots to the waiting receiver.

The following flow diagrams represent operation of the objects mentioned above.

Figure 4:
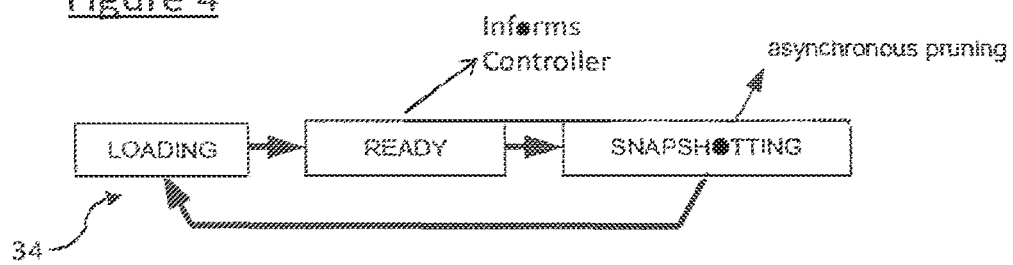
FIG. 4 is a schematic diagram showing snapshotting replicator states.
Figure 5:
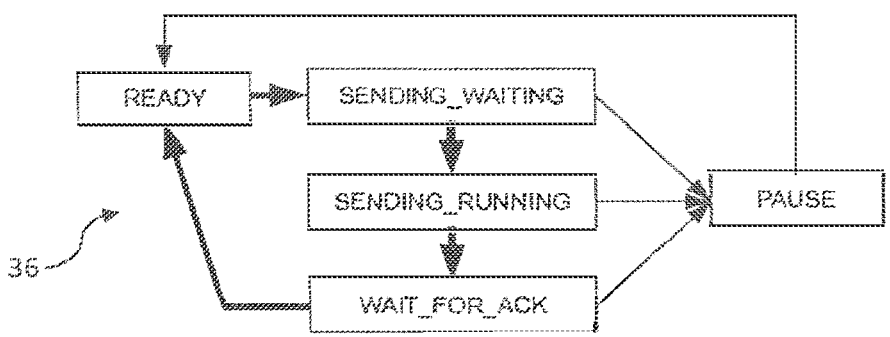
FIG. 5 is a schematic diagram showing per-slave sending replicator states.
Figure 6:
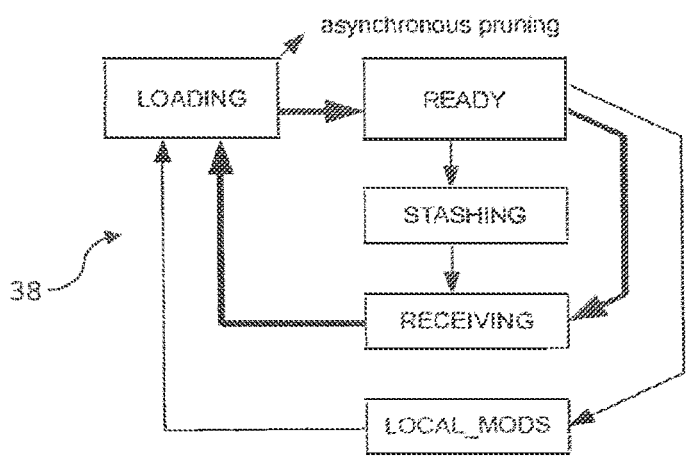
FIG. 6 is a schematic diagram showing receiving replicator states.

The heavy lines in FIGS. 4, 5 and 6 correspond to the usual success cases, other lines corresponding to error-handling or partition-recovery states.

Snapshotting Replicator States

See FIG. 4.

A snapshotting replicator 34 receives notification of filesystem modifications and schedules snapshots to be taken. When the snapshots are taken it informs its per-slave sending replicators 36 that they should check whether to initiate an replication event to its slave, which has a receiving replicator 38 set up ready to receive.

It begins in a LOADING state, which means it is interrogating the filesystem for current snapshot state and loading it into its forest. When this finishes, it enters a READY state.

When it reaches the READY state, it informs the controller 30 of the new state, which the controller broadcasts to other nodes in the cluster. When a scheduled snapshot is due to occur, it enters SNAPSHOTTING for the duration of the snapshot taking place.

It maintains a global forest 35 (FIG. 3) which represents the global state of the snapshot data on all nodes for that filesystem. It is informed about the other servers' state by an informGlobalState interface which its controller calls when it receives updates about global state from other servers in the cluster.

The scheduling of snapshots in response to modified notifications works as follows:

[A] If a filesystem receives just one modification, it is snapshotted within a SNAPSHOT_QUICK timeout, based on the last period between modifications.
[A] If a filesystem receives many modifications within a SNAPSHOT_QUICK interval, it takes a snapshot at the SNAPSHOT_INTERVAL timeout, which is longer.

This means that if a filesystem is modified heavily, it gets snapshotted every SNAPSHOT_NTERVAL seconds, whereas if it is just modified once, it gets snapshotted within SNAPSHOT_QUICK seconds. Some sample values of these values are 30 seconds and 60 seconds, respectively.

When a snapshot is complete, the replicator also handles pruning asynchronously, in order to keep the number of snapshots to a reasonable number (typically around 100 per filesystem). Pruning is described in detail later.

Snapshotting Databases

Snapshotting databases requires co-operation from the database in order to coerce it into making its on-disk state consistent by holding a lock on the database during the snapshot operation. In one embodiment, the invention achieves this by issuing a "FLUSH TABLES WITH READ LOCK" query to a MySQL database. Other database engines can be integrated with the invention with equivalent mechanisms. This allows databases, as well as applications and mailboxes to be snapshotted, automatically recovered and live-migrated between servers. Databases and related filesystem snapshots may be coordinated in time such that an application's state on the disk and in the database is consistent.

Per-Slave Sending Replicator States

See FIG. 5.

A per-slave sending replicator 36 is responsible for initiating replication events in conjunction with a remote receiving replicator 38. It begins in the READY state (no loading is necessary because it refers to the forest of its parent snapshotting replicator). When it has check called on it, either because a new snapshot has been created, or a server has just been added as a slave and a new per-slave sending replicator created for it, it calls findUpdates on its forest.

When findUpdates indicates that a specific data stream (with defined start and end snapshot ids) should be sent from the local server to the remote slave which the per-slave is set up for, it sends a message over the group messaging protocol to the remote receiving replicator 38 and goes into state SENDING_WAITING. If the remote receiving replicator 38 accepts the replication attempt, the per-slave sending replicator 36 goes into state SENDING_RUNNING and the snapshot data begins to flow over the network. When all the snapshot data has been sent, the snapshotting sending replicator 34 enters the WAIT_FOR_ACK state, which means it is waiting for the remote receiving replicator to acknowledge correct receipt and storage of the data indicated. When that happens (again via the group messaging protocol), the per-slave sending replicator re-enters the READY state.

If at any point a failure message is received from the remote side, or if a timeout fires (which may occur if the remote machine fails or the network becomes partitioned), the state machine transitions to PAUSE and then transitions back to READY after a further timeout. This allows replication to continue, without causing large numbers of messages to be sent in case the remote side is temporarily unable to receive new replication events.

Receiving Replicator States

See FIG. 6.

When a server is a slave for a filesystem 10, the filesystem mount handler 32 is in RECEIVING mode and has ensured that the filesystem itself is unmounted, and available to receive filesystem updates from a remote per-slave sending replicator 36 (of which there will usually be exactly one, since there is only one master per filesystem within any given network partition—if there is more than one master after a network partition and subsequent recovery, the master negotiation described above will ensure that one master cedes in a short amount of time so that replication can continue).

The receiving replicator 38 starts in the LOADING state, where it is interrogating the filesystem for current snapshot data. When it receives the filesystem data, it informs its controller 30 of the current snapshot state. The controller 30 informs other servers in the cluster of this, and the receiving replicator 38 enters the READY state. Having informed other servers of the current state, they may decide, based on their global forests calculations, that the slave has diverged, or that it needs a simple "fast-forward" update.

If the update is a fast-forward update, the replicator proceeds directly to the RECEIVING state, and snapshot data flows over the network. When it completes transitions to the LOADING state, checks that the expected data was received correctly, then initiates asynchronous pruning and immediately becomes ready for the next replication event.

If the update is not a fast-forward update, the replicator instead transitions into the STASHING state, where it stores in a local "stash directory" binary copies of the snapshots between the "slice point" (the end_snapshot indicated by the sending replicator which is the latest common snapshot between the master and the slave) and the current head of the filesystem on the slave. Once this stashing is complete, the filesystem is immediately ready to receive the changes and replication proceeds as normal. The start snapshot is then marked as immutable so that the stashing process can be reversed.

In some situations the local filesystem on the slave can be modified (even though it is meant to be unmounted, administrators may accidentally mount it and modify it, for example). In this case, the replication will fail, however the receiving replicator detects this case and transitions into LOCAL_MODS, which causes the local modifications to be snapshotted and safely stashed. The receiving replicator emits a failure message and the per-slave sender will transition to PAUSE and try again when its timeout fires, so that replication can continue.

Pruning Algorithm

The processes above describe creating snapshots, but not destroying them. It's important to destroy old snapshots in order to bound the number of snapshots to a reasonable number. Filesystem operations become slow when you have more than a few hundred snapshots. To a user, the difference between two point-in-time snapshots taken a minute apart from over a year ago is likely to be less important than the difference between two point-in-time snapshots from the last few minutes, so it makes sense to prune older snapshots more aggressively than newer ones. Pruning is the process of collapsing the changes from a number of sequential snapshots into a single snapshot.

An important property of the pruning process is that it results in the same snapshots being chosen for deletion on all the servers in the cluster. This is so that the findUpdates process will find a recent common snapshot and avoid sending unnecessarily large amounts of replication data.

The pruning algorithm works by defining a set of sections: typically the last hour, last day, last week and last month, and then "filling in the gaps" between the sections with, 'waypoints", for example the system can be configured so that all snapshots from the last 60 minutes will be kept, hourly snapshots are kept for the last day, daily snapshots are kept for the last week, etc.

Snapshots are suggested for deletion by the suggestedDeletions function if they are not the closest snapshot to a waypoint.

Because the waypoints are quite stable with respect to the passage of time, almost the same pruning decisions are taken on all servers, even if pruning occurs at slightly different times on different servers.

Very recent snapshots will also be excluded from consideration for deletion, and immutable snapshots are never deleted. Snapshots are marked immutable (locally on a specific server only) if a stash has happened which is based on that snapshot, since to recover a stash of a snapshot which is based on an intermediate snapshot, the intermediate snapshot must still exist, and therefore for the stashes to be usable to recover data from, snapshots which the stashes are based upon must be made immutable and never deleted until the stash is discarded.

Both the Snapshotting replicator 34 and the Receiving replicator 38 utilise this pruning algorithm to keep the number of snapshots on masters and slaves within reasonable bounds.

The system may optionally expose an interface for users to roll back to specific snapshots, clone new applications and databases from snapshots at a given point, and to manually set certain snapshots to be immutable.

The Controller

This section explains the overall "controller" process which is responsible for being aware of which servers are online within the current network partition (if any) and therefore which server should be elected as the master for each site. It is also responsible for adding slaves if a filesystem is under-replicated and removing slaves if a filesystem is over-replicated.

Cluster Boot and Merging Process

Figure 7:
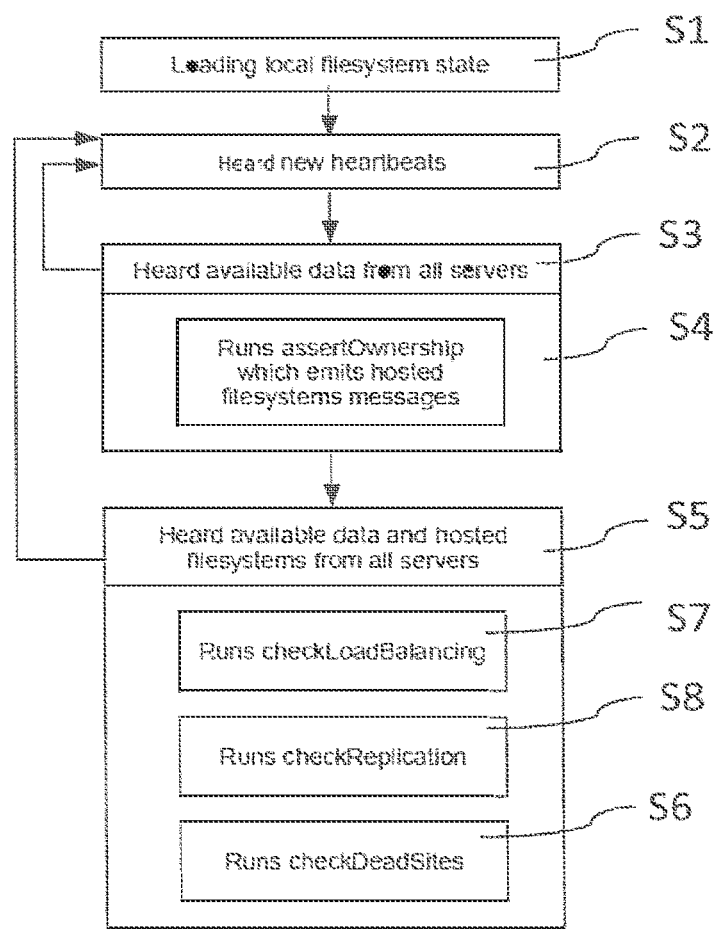
FIG. 7 is a schematic diagram showing controller state transitions.

See FIG. 7.

During normal operation, servers will broadcast several messages over the group messaging system at appropriate intervals:

1. Heartbeat messages—M2 asserting the liveness of each server, and that each server is passing its own self test (that all systems and processes are operating correctly on that server). This data is stored on every machine in a mapping called the liveness mapping.
2. Available data messages M2—stating which snapshots of which filesystems each server has, used to determine the filesystem state and to inform the replication decisions as described. This data is stored on every machine in a mapping called the available data mapping.
3. Current masters messages—M3 stating which servers are currently master for which filesystems. This data is stored on every machine in a mapping called the current masters mapping.
4. Load value messages—M4 stating the amount of load currently being generated by each application on each server, used in the load balancing calculations.

There are also a number of periodic checks which may run at configured intervals:

1. Emit heartbeats (S4)
2. Emit current masters messages (S4)
3. Checking dead filesystems (S6)
4. Checking load balancing (S7)
5. Checking redundancy (over/under-replication) (S8)

When a server starts, it begins by reading the current filesystem S1 and snapshot state. If there was a clean shutdown last time, it may read this data from a local cache file which also includes data regarding the previous current masters state and also the servers which were live just before this server was previously shut down (a CHECK_TIMEOUT grace period is applied for each server which was previously live to come back online before the controller "rescues" their sites). This is to facilitate quick cluster restarts when necessary, because excessive remounting, which is slow, is avoided.

Heartbeat Messages

The controller 30 uses the group messaging system to emit a heartbeat from each server each second. The system records the last time it heard from each server S2 and every server can therefore detect which servers are live (i.e. in the same partition as it) based on a CHECK_TIMEOUT interval, and which servers are silent (failed or partitioned).

Avoiding Premature Actions

When a server is starting up, it may observe some state which appears to indicate that it should perform some action, such as rescuing apparently dead filesystems. However this behaviour may be wholly incorrect, because it may not have yet heard all of the information it needs in order to make the correct decision. Therefore, we define a concept called heardFromAllServers S3, S5, which defines that the set of live servers (servers from which we have heard a heartbeat in the last CHECK_TIMEOUT seconds) must be a subset of the keys of the mapping in question. Therefore we guard the periodic checks which would perform such potentially damaging actions with a heardFromAllServers check, checking either that we have heard available data or current masters messages from all servers.

FIG. 7 describes, therefore, the states which a server will go through when it starts up, and how a new server joining, emitting a heartbeat, but not yet having asserted its ownership of filesystems can cause the other servers in the cluster to delay running their loops again until the new server has emitted a datasets message. Only when all servers have heard (S3) all other live servers emit a datasets message will any server be allowed to emit a current masters (S4) message, and only when there is global consensus on the current current masters state will any server therefore be able to run checkDeadSites (S6). This makes the cluster very robust to servers or networks failing and being brought back online without making partially-informed decisions which could cause unfortunate consequences, such as an old server coming online and claiming to be the master for a large number of filesystems, when in fact it had two week old copies of all the data.

Decision Making Using Leaders

The system defines a leader for a filesystem as the server with the lowest lexicographical IP address which has a copy of that filesystem. For example, in FIG. 1A, the current master could be server A, but the leader could be server B. This ibreaks the symmetry in an otherwise homogeneous distributed system.

Note that being a leader for a filesystem is very different to being the master for it. The leadership check is only used in order to establish which server is able to make decisions about changing which server is the current master is for that filesystem. This mechanism stops multiple servers attempting conflicting migrations of filesystems simultaneously. Of course, in some cases the leader server would be the current master—the leader role is a separately defined role to the master role, but could be on the same server.

Current Masters Message Emits Binary Values to Converge on Global State Consensus The current masters message M3 contains, from each server 1, a list of which sites it is and is not hosting. This allows all servers to construct a globally consistent current masters mapping and to resolve competing masters after partition recovery.

It is upon receipt of an current masters message M3 where the case of two competing masters in a recently-merged partition can be detected and handled. This is done by using the choose CandidateMasters function described in the snapshot graph section.

The system broadcasts a binary value True or False for each filesystem. By looking at the totality of current masters messages from all servers, and comparing to the system's own current masters mapping, we correctly synchronise the global state using the following logic:

[A] IF the server is claiming to host the filesystem, but we do not think it is hosted there OR the server is claiming to not to host the filesystem but we think it is hosted there <sup>A</sup> AND we are the leader for that filesystem
<sup>A</sup> THEN move it to the best server, based on the candidate masters calculation Local and Remote Redundancy Calculations (addSlaves)

The replication checking loop, for each filesystem 10 a server 1 is presently a master for, checks two things: whether a filesystem is under-replicated, in which case it calls addSlaves on the snapshotting replicator 34 which creates some new per-slave replicators 36 for the chosen new slave servers (which then automatically create new receiving replicators, and the filesystem gets copied to the new slaves).

The second check is whether a filesystem is over-replicated, in which case it issues a deleteFilesystem message, which causes the remote slaves to trash their copies of the filesystem, and the per-slave replicators 36 for those slaves are shut down.

In one embodiment, the cluster is aware of which servers are in a local data centre and which servers are in a remote data centre. This allows it to be smarter about how many slaves in each locality to replicate to, based on the configuration of the cluster. For example, a cluster administrator can decide that she wishes to have a localRedundancy value of 2, which means two servers in the local data centre have each filesystem replicated to them in addition to the master (so that the cluster can cope with the failure of 2 local servers), a globalRedundancy value of 1, which means that two other data centres (localities) must have each filesystem replicated to them, and a slavesPerRemoteLocality value of 1, which means that each remote locality must have one server which gains a copy of the filesystem.

Since filesystems and applications may be live-migrated from one data centre to another, additional replicas might be automatically created in the new data centre when the filesystem arrives there, and some replicas in the old data centre might be removed.

Checking Dead Filesystems

If a server fails, some filesystems will cease to be hosted on any live server. In this case, the checkDeadFilesystems loop on each server calculates the set of dead filesystems which it can do anything about, its concerns: those filesystems which that server has a copy of for which the current master of the filesystem (if any) is not presently live.

For each of these filesystems, each server ascertains whether or not it is the current leader for the filesystem, and if it is, it elects a new master for the filesystem based on one of the optimum servers from the choose CandidateMasters function.

Distributed Protocol Handler

Mediating all protocol access (example protocols: HTTP, HTTPS, MySQL client protocol, SMTP, POP and IMAP) between clients and the system is the distributed protocol handler 5a-b described in FIG. 8.

They allow any request for any filesystem to be directed to any server in the cluster. This means that, for example, a DNS configuration can be set up so that a website has multiple 'A' records, each pointing to different servers in the cluster, to take advantage of the (limited) built-in redundancy in HTTP where a web browser will try an alternative 'A' record if the first one it tries is unavailable.

Figure 8:
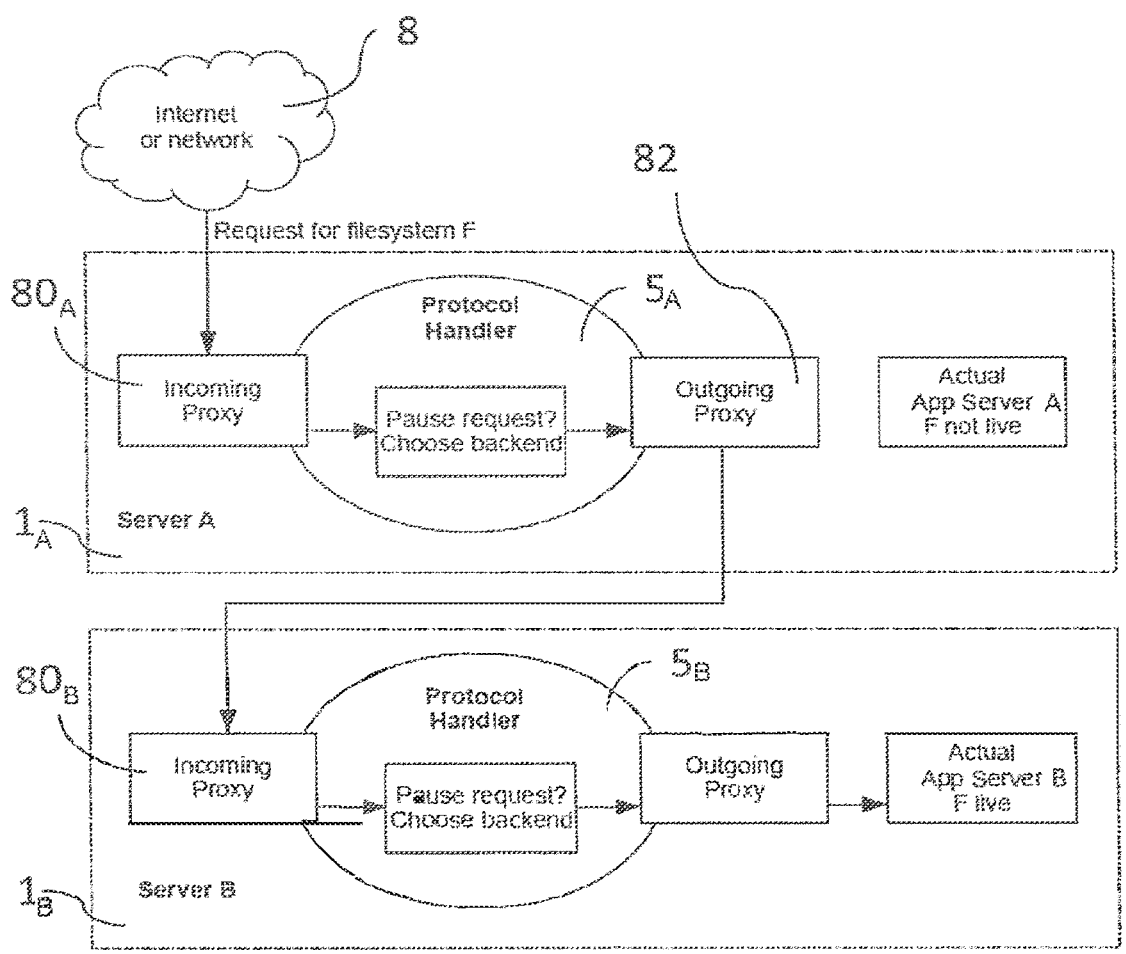
FIG. 8 is a schematic representation of a distributed protocol handler.

On each server 1a or 1b, the protocol handler 5a or 5b respectively "sits in front of" the actual application servers (example application servers: Apache, MySQL server, Exim, Dovecot). In addition, the protocol handler is connected to the controller described above, and has access to its current masters mapping. The protocol handler can "speak" just enough of each protocol to establish which filesystem the request should be routed towards. The example FIG. 8 shows a configuration of two servers 1 where a request from a client 7 came to server A via the network 8 for filesystem F, and is received by an incoming proxy 80A. The protocol handler 5a chooses the backend server by inspecting the controller's current masters mapping at server A 1a, and discovers that it needs to route the request to server B 1b, so its outgoing proxy 82 connects to server B's incoming proxy 80B.

Server B then inspects its current masters mapping (which is in agreement with server A's by the global state consensus described above) and routes the request to its own "backend server". At this point the connections are "seamlessly joined up" so that neither the client 7 nor the backend server in this case B can tell that this is not a perfectly ordinary client connection. The client and the correct backend server then communicate as normal (for example: the server sends the client a web page over an HTTP connection), but simultaneously the protocol handlers 5a-b are keeping track of the connection passing through them.

They need to keep track of the connection because they have the ability to pause new requests on demand. This is in order to implement seamless live-migration. If the controller 30a-c has requested that a protocol handler 5a-b pauses connections to a given server 1, it will, in one of two modes. It will wait a timeout for the "in-flight" connections to close naturally, while pausing all new incoming connections, then:
1. If the pause is forced, and if the current in-flight connections do not close naturally, it will forcefully terminate them.
2. If the pause is not forced, it will wait a timeout for the connections to die naturally, while pausing all new incoming connections. If the in-flight connections do not complete in the time allocated, the pause attempt is abandoned and the new paused connections are "unleashed".

If the pause succeeded, it waits until the controller 30 requests that the pause is "unblocked" at which point the system checks which backend server 1 should be connected to again by asking the controller (crucially, the backend may have changed during the pause operation), and connects to the potentially-different backend server, unleashing a "flood of requests" which were building up during the pausing process onto the new server, which can then process them as usual. If the delay is sufficiently short, end users will only notice a small delay.

Live-Migration

Now we have all the pieces of the puzzle to describe the complete live-migration process with reference to FIG. 9. To recap, we can:
<sup>A</sup> Ensure that replication proceeds to slave servers even under failure and partition conditions, and recover after the recovery of those conditions.
<sup>A</sup> Control in-bound connections with the distributed protocol handler so that any request can be addressed to any server in the system, and so that the system can momentarily pause in-bound connections, wait for in-flight (pending) ones to complete, and the redirect requests to a different server.

Now we can describe the live-migration state machine transitions and protocol. The controller may, under the user's direction or because of one of two mechanisms described below, choose to initiate a live-migration of an application from one server to another.

The controller of a "Thrower server" 30 (the master server) creates a Thrower object in state INIT 90, which is responsible for simultaneously controlling the replication system and the distributed protocol handler. This Thrower object sends a requestmoveload message to the remote controller of a target server (Catcher) (the new master), which attempts 92 to allocate a slot for the live-migration (there are a finite number of live migrations which are allowed to occur in parallel). If a slot is allocated, it creates a Catcher object in state INIT 94, and the catcher issues an acceptmoveload message. The Thrower then instructs 96 its snapshotting replicator 34 to construct a per-slave-replicator 36 for the target server, in case it is not already a slave. The Thrower then sends a latestsnapshot message, which instructs the catcher to enter a PREREPLICATION state 98 until that snapshot has been received. This may not be the final snapshot which is used in the replication, but it at least gets the catching server "quite up to date" so that the critical path element of the live-migration, where in-bound requests for the filesystem are momentarily blocked, is as short as possible. If the catcher observes that it already has this snapshot, it can bypass the PREREPLICATION phase and initiate a continuemoveload message immediately. Otherwise, it emits 99 a prereplication message and then when the catcher's replication system observes the snapshot arriving, it informs the thrower that it may continue by sending a continuemoveload message. The thrower then instructs 102 its distributed protocol handler to begin pausing all new incoming requests and to notify it when all current in-flight requests are finished. The catcher does the same 100A. Now the entire live-migration process can be in one of two modes, forced or unforced. If the mode is unforced, and there are long-lived connections to the current master (such as an IDLE IMAP connection, for example), the pausing can be abandoned which causes the entire live-migration to be abandoned (it can be useful, for example if it is necessary to completely shut down a server, to force the live-migrations so that they always succeed in a short amount of time, at the cost of possibly closing some long-running connections). When both sides' distributed protocol handlers succeed in closing all current connections and pausing/blocking 100B all new incoming connections, the thrower instructs 104 its filesystem mount handler to unmount the filesystem, so that no further changes can possibly be made to it, at which point it takes a final snapshot of the filesystem and replicates 106 this final snapshot to the catcher, all while new incoming requests for the application are paused. When the replication 108 succeeds, the catcher mounts 110 the filesystem, and emits a completemoveload message which results in both the thrower and the catcher unblocking 112A, 112B their respective distributed protocol handler and so a flood of paused requests (users waiting patiently for the few seconds that this process takes) are unleashed on the new master for the site.

Driving Live-Migration

The controller 30a-c has two mechanisms for automatically initiating live-migration events. These are a load-balancing mechanism and an application locality preference mechanism.

Load Balancing: Load>av+Q

All the servers 1 in the cluster are constantly trading information about the current levels of load that are being generated by each application, for example by measuring the sum of the total request times for that application within a ten second period. These measurements are "smoothed out" by using an exponential decay algorithm over 10 minutes (the same algorithm used by UNIX load average calculations). Servers are continually (in the checkLoadBalancing loop) checking whether their total load (the sum of the load across all of their applications) exceeds the average load in the cluster plus a "fudge factor" Q, which exists to stop the servers constantly trading load. If a server's load exceeds av+Q then the server elects a recipient server which is the server with the lowest load out of all the servers, and picks a site out of its current sites which is the maximally loaded site which will not cause the recipient to itself think it is over-loaded.

This is known as the "anti-hot-potato choice function", because it stops servers constantly trading load. The site which is chosen is live-migrated to the recipient.

The emergent behaviour from this simple set of rules is that servers will automatically load-balance themselves by migrating entire applications around between servers in the cluster. Furthermore, if one specific application gets a large spike in traffic, that application itself will not get live-migrated (because the anti-hot-potato-choice function forbids it); rather all the other applications on that server will get migrated away, leaving that server to be a dedicated server for that application.

Application Locality Preferences

Recall that the cluster may be distributed across geographically diverse regions. Users may wish to express a preference such that if a given region is available (if there are servers which are online there) then their site should be primarily hosted there. If the user specifies or changes this preference (which may be stored in a database), the controller detects the change and initiates a live-migration of both the application and any dependent databases. This is important so that applications and their databases are always stored in geographically local regions, since database access is often assumed to be low-latency. It may also be important for an application to not be hosted in or replicated to a given locality, in order to comply with local legislation.

Protecting Against User Error

In data protection systems that protect against hardware failure, such as RAID or synchronous replication, if a user accidentally deletes data the deletion is replicated to the replica device(s) and the deleted data will be permanently lost.

As is explained above, the system of the present invention continually takes point-in-time snapshots of all of the data stored on the system, and these snapshots are stored so that they can be accessed by a user, for example via a web interface which presents a graphical representation of the available snapshots. If the user accidentally deletes data from the system a previous data snapshot can be selected using the interface, by selecting one of the snapshots represented graphically, and the system can be restored or reverted to its state at the time at which the selected snapshot was taken, e.g. prior to the deletion, without requiring intervention by a system administrator.

Above described embodiments of the present invention deliver a number of features and advantages as set out below:

1. Automatic recovery from server or data centre failure for resilience

Reverting to FIG. 1A, when a heartbeat message indicates that a server has failed, or perhaps even an entire subset of servers or the connection to a subset of servers (such as for example switch 3E or 3W), the fact that a file system attached to that server supporting a particular application is now dead can be recognised and the situation can be automatically recovered with minimal if any interruption to the end client 7 receiving the service supported by the application for which the file system has now become dead.

This aspect is supported by the mechanism of continual file system replication whereby master servers continually transmit snapshots with file system images for live applications that they are supported to a designated set of slave servers. Reverting again to FIG. 1A, for example a master in the eastern subset may ensure that he designates always at least one other server in the eastern subset and at least one other server in the western subset for supporting delivery of a particular application.

A current master for an application can perform local and remote redundancy calculations (the addSlave function) for checking and increasing redundancy if necessary. Thus, a master can autonomously determine not only the number of slaves to which it replicates application data, but also the nature and location of those slaves. Amongst other things, this can be guided by user input or user preferences.

2. Recovering from network partitions—most valuable data chosen.

Referring back to FIG. 2A, in recovery from a partition the leader server can autonomously decide which of a number of potential masters should be elected as the new master. It will readily be apparent that after a partition, there could be servers of either side of the partition which each consider themselves to be masters of the application. In that case, the graph weighting function described earlier can be implemented to determine the greater centre of mass and thus to determine which master has the most valuable data. Note that recovery from a partition has been considerably aided by the fact that there was, prior to the partition, ongoing file system replication so that each of the potential new masters will already have a version of the file—this is a question of determining who has the best version.

3. Migration criteria

In addition to providing a mechanism which supports automatic recovery from failure and recovery from network partitions, the embodiments described above are capable of delivering live migration for optimisation purposes. Thus, the servers in a cluster can autonomously determine by their exchange of messages that an application would be better served on a different master, even in the case where there has been no failure of the current master. This can be done in a way to balance the load, or to deliver locality preferences for applications (such as may already have been input by user or administrator). The mechanism of comparing the load to an average load across the servers in the cluster and a factor Q allows vertical scaling of an application to deliver dedicated servers on demand. That is, where an application is taking up a significant amount of a current server resource, rather than making a determination to move that application off that server, a determination can be made to move other applications off that server to different servers, and thereby allow the application to increase its resource on the current server.

4. Live Migration

Live migration as discussed above is supported by controlling replication once a live migration has been initiated, and by the handling of requests during migration by the protocol handler.

5. Interactive control of point in time restore feature—this is supported by user interface which allows a user to select a point in time to which a file system can be restored. This can be particularly useful for emails, databases and files to support snapshotting at different times, rolling back and browsing. It provides protection against user error, particularly when a user deletes something which they did not mean to delete at the application level. Although the deletion may be effective, it would be possible to restore an earlier snapshot of the deleted item for presentation to the user at the interface.

6. Horizontal Scalability

A significant advantage of the embodiments of the invention described above if the ability to add or remove servers from a cluster to increase or decrease its entire capacity. For example, the cluster can be managed by moving all the sites of one server, in order to upgrade it or take it off line for example with a managed replication process for migrating the applications prior to the upgrade or off line process. This can be managed substantially autonomously by the cluster should that be desired, by having a leader server for the application make a decision about a new master, based on current masters messages which emit binary values to converge on a global state consensus about who would be the best master. Thus, if detection of a new server or removal of a server occurs, the leader server can autonomously take it upon itself to designate a new master in the context of the newly formed cluster (which could now comprise more or less servers). It is in this context that an existing cluster could be a cluster of one server, in the sense that an additional server could be added into that cluster.

A particularly useful point of the described mechanism to support this is that of avoiding premature action—servers which are new to the cluster only do anything after they have received sufficient information about the whole system to make a proper decision. The load balancing mechanism assists in allowing new servers to have load moved to them because on addition of the new server (before they are supporting any file systems) the global average load level decreases such that a decision to migrate some of the load to the new servers can autonomously be effected.

The above described embodiment of the invention solves the redundancy problem in the following way:

All changes to application state are asynchronously replicated to a configurable number of other servers in the system. Point-in-time snapshots of each application's data are taken within a configurable number of seconds of detection of changes to the application data, and the difference between these snapshots are replicated between the servers. This allows an application to be recovered automatically from a very recent copy of the data in the event that the system detects a failure of a component, server, network device, or even an entire data centre. Since there is no reliance on shared storage, no quorum, fencing or STONITH setup is required.

The above described embodiment of the invention solves the load-balancing problem in the following way:

The load caused by applications is continually measured by the system and used in a distributed decision-making process to initiate seamless live-migrations of applications between servers. For example, if a server A is hosting applications {1, 2, 3} and a server B is hosting applications {4, 5, 6}, and both applications 1 and 2 experience a spike in load, while the remainder are quiescent, the system may elect to live-migrate 2 to server B for a balanced configuration of A→{1,3}, B→{2, 4, 5, 6}.

In the above described embodiments, a "seamless" live-migration is one in which all the modification which are occur on an application's filesystem on the old master by in-flight requests to the application are completed before the final snapshot is taken and replicated to the new master, so that when the filesystem is mounted on the new master, no application code or client can ever tell that the live migration happened, and no data is lost.

What is claimed:

1. Computer software which, when executed by appropriate processing means, causes the processing means to implement a method of managing snapshots of a filesystem, where the filesystem is replicated across multiple servers connected in a cluster comprising:
  identifying each snapshot by a snapnode object comprising a snapshot identifier, a parent pointer to an earlier snapshot on a specific server where the snapshot was taken, and a set of servers where this snapshot is presently stored;
  taking a new snapshot of the filesystem by one of the set of servers that is an active master of the file system;
  creating a snapnode object for the new snapshot identifying the active master as a server where the new snapshot is stored;
transmitting the new snapshot to the other servers of the multiple servers; and modifying the snapnode object to identify the other servers as servers where the new snapshot is stored,
  wherein the method is used to manage recovery of a file system after an event in which the active master is to confirm or modify its status.

2. Computer software according to claim 1 wherein the event is the partitioning of a cluster of servers in which the active master and the other servers are connected, wherein after recovery from the partition there are at least two candidate master servers, each with a graph of snapnode objects for the filesystem, wherein the graph at each candidate master is traversed to assess its value, and the candidate master with the graph indicating a highest value adopts a role as new master for the filesystem.

3. Computer software according to claim 2 wherein the snapshot data is globally synchronised across the servers, whereby divergence of a version of the data at each candidate master can be assessed against the globally synchronised snapshot data.

4. Computer software according to claim 3 wherein the event is loss of at least one other server of the multiple servers, which was acting as a slave server to the active master, wherein after a replacement slave has been designated by a master, the master instructs the new slave to replicate a complete copy of the filesystem so that replication can begin from a current point.

5. Computer software according to claim 2, the implemented method comprising the step of saving snapshots from a given slice point in the graph to a local storage area.

6. Computer software according to claim 2, the implemented method comprising the step of pruning a snapshot.

7. Computer software according to claim 2, the implemented method comprising the step of determining which action to take in order to resolve a divergence of graphs on multiple servers representing the same filesystem based on:
  a current master for the filesystem;
  a graph of snapnode objects for that filesystems global state;
  a list of current slave servers to that master for that filesystem.

8. Computer software according to claim 1, wherein the method further comprises: detecting an event selected from the following: (i) failure of current master server for the application, (ii) a partitioning of the cluster, (iii) a reduction in the number of servers in the cluster, (iv) an increase in the number of servers in the cluster, (v) introduction into the cluster of a server for which a user has expressed a preference for hosting the application, (vi) a change in load of applications amongst servers in the cluster, such that a load rebalancing event is required; and
  in response to the event determining a new one of the servers being the active master of the filesystem.

9. A method of managing snapshots of a filesystem, where the filesystem is replicated across multiple servers connected in a cluster comprising:
  identifying each snapshot by a snapnode object comprising a snapshot identifier, a parent pointer to an earlier snapshot on a specific server where the snapshot was taken, and a set of servers where this snapshot is presently stored;
  taking a new snapshot of the filesystem by one of the set of servers that is an active master of the file system;
  creating a snapnode object for the new snapshot identifying the active master as a server where the new snapshot is stored;
transmitting the new snapshot to the other servers of the multiple servers; and modifying the snapnode object to identify the other servers as servers where the new snapshot is stored,
  wherein the method is used to manage recovery of a file system after an event in which the active master is to confirm or modify its status.

10. A method according to claim 9 wherein the event is the partitioning of a cluster of servers in which the active master and the other servers are connected, wherein after recovery from the partition there are at least two candidate master servers, each with a graph of snapnode objects for the filesystem, wherein the graph at each candidate master is traversed to assess its value, and the candidate master with the graph indicating a highest value adopts a role as new master for the filesystem.

11. A method according to claim 10 wherein the snapshot data is globally synchronised across the servers, whereby divergence of a version of the data at each candidate master can be assessed against the globally synchronised snapshot data.

12. A method according to claim 9 wherein the event is loss of at least one other server of the multiple servers, which was acting as a slave server to the active master, wherein after a replacement slave has been designated by a master, the master instructs the new slave to replicate a complete copy of the filesystem so that replication can begin from a current point.

13. A method according to claim 9 comprising the step of saving snapshots from a given slice point in the graph to a local storage area.

14. A method according to claim 9 comprising the step of pruning a snapshot.

15. A method according to claim 9 comprising the step of determining which action to take in order to resolve a divergence of graphs on multiple servers representing the same filesystem based on:
  a current master for the filesystem;
  a graph of snapnode objects for that filesystems global state;
  a list of current slave servers to that master for that filesystem.

16. A method according to claim 9 wherein the snapshot identifier identifies the time at which the snapshot was taken and the server on which the snapshot was taken.

17. A method or server according to claim 9 wherein a user interface is presented to a user for permitting access via a user to snapshots selected by a user.

18. A method according to claim 9 further comprising storing snapshots taken of the filesystem such that a previous snapshot of the filesystem can be selected by a user from the stored snapshots.

19. A method according to claim 18 wherein the previous selected snapshot of the filesystem can be used to restore the system to its state at the time of the selected snapshot.

20. A system comprising:
- a processor; and
- memory communicably coupled to the processor;
- wherein the processor:
- identifies each snapshot by a snapnode object comprising a snapshot identifier, a parent pointer to an earlier snapshot on a specific server where the snapshot was taken, and a set of servers where this snapshot is presently stored;
- takes a new snapshot of the filesystem by one of the set of servers that is an active master of the file system;
- creates a snapnode object for the new snapshot identifying the active master as a server where the new snapshot is stored; and
- transmits the new snapshot to the other servers of the multiple servers; and
- modifies the snapnode object to identify the other servers as servers where the new snapshot is stored,
- wherein the method is used to manage recovery of a file system after an event in which the active master is to confirm or modify its status.

* * * * *